United States Patent
Ho et al.

(10) Patent No.: US 10,937,293 B2
(45) Date of Patent: Mar. 2, 2021

(54) METHOD OF INVENTORY CONTROL AND SYSTEM THEREOF

(71) Applicant: Agency for Science, Technology and Research, Singapore (SG)

(72) Inventors: Chin Keong Ho, Singapore (SG); Yeow Khiang Chia, Singapore (SG); Kay Chuan Benny Tan, Singapore (SG); Zheng Wang, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 0 days.

(21) Appl. No.: 16/641,369

(22) PCT Filed: Aug. 31, 2017

(86) PCT No.: PCT/SG2017/050430
§ 371 (c)(1),
(2) Date: Feb. 24, 2020

(87) PCT Pub. No.: WO2019/045641
PCT Pub. Date: Mar. 7, 2019

(65) Prior Publication Data
US 2020/0226900 A1    Jul. 16, 2020

(51) Int. Cl.
*G08B 13/24*    (2006.01)
*G06K 7/10*    (2006.01)
*G06Q 10/08*    (2012.01)

(52) U.S. Cl.
CPC ..... *G08B 13/2462* (2013.01); *G06K 7/10099* (2013.01); *G06Q 10/087* (2013.01); *G08B 13/2417* (2013.01); *G08B 13/2485* (2013.01)

(58) Field of Classification Search
CPC ............ G08B 13/2462; G08B 13/2417; G08B 13/2485; G06K 7/10099; G06Q 10/087
See application file for complete search history.

(56) References Cited

U.S. PATENT DOCUMENTS

| | | | |
|---|---|---|---|
| 8,321,302 B2 | 11/2012 | Bauer et al. | |
| 2008/0055088 A1* | 3/2008 | Fabre | G06Q 10/087 340/572.1 |

(Continued)

FOREIGN PATENT DOCUMENTS

| | | |
|---|---|---|
| WO | 2005033645 A1 | 4/2005 |
| WO | 2013126391 A1 | 8/2013 |

OTHER PUBLICATIONS

International Search Report for International Application No. PCT/SG2017/050430 dated Oct. 19, 2017, pp. 1-4.

(Continued)

*Primary Examiner* — Mohamed Barakat
(74) *Attorney, Agent, or Firm* — Winstead PC

(57) ABSTRACT

There is provided a method of inventory control for an inventory including items sequentially arranged on one or more structures, each item having a radio frequency tag associated thereto, the tag having stored therein an identifier for identifying the associated item. The method includes: obtaining data in relation to multiple items arranged in a row on a structure, the data comprising multiple sets of identifiers detected from interrogating the tags of the plurality of items at a plurality of instances along the row; determining a sequence of detected items in the row based on the data obtained, the sequence including estimated relative positions of the detected items in the row; and determining whether an item of the detected items in the row is misplaced based on the estimated relative position of the item in the row and a reference relative position of the item in the row.

16 Claims, 10 Drawing Sheets

(56) References Cited

U.S. PATENT DOCUMENTS

| | | | | |
|---|---|---|---|---|
| 2009/0106037 A1* | 4/2009 | Harindranath | G06Q 50/10 | 705/342 |
| 2014/0247116 A1* | 9/2014 | Davidson | G06Q 10/087 | 340/10.1 |
| 2014/0361078 A1* | 12/2014 | Davidson | G06K 7/10356 | 235/385 |
| 2015/0134403 A1* | 5/2015 | Schwartz | G06Q 10/087 | 705/7.29 |
| 2015/0379317 A1* | 12/2015 | Kelly | G06Q 10/087 | 705/28 |

OTHER PUBLICATIONS

Written Opinion of the International Searching Authority for International Application No. PCT/SG2017/050430 dated Oct. 19, 2017, pp. 1-5.

* cited by examiner

| Runs | Tags |
|---|---|
| 1 | $T_1, T_2, T_4, T_5$ |
| 2 | $T_1, T_2, T_3, T_5, T_6, T_8, T_9$ |
| $\vdots$ | $\vdots$ |
| $x$ | $T_{90}, T_{91}$ |
| $\vdots$ | $\vdots$ |
| $M$ | $T_{195}, T_{196}$ |

FIG. 8

| Antenna | : | Positions of tag |
|---|---|---|
| Ant. 1 | : | $x_1, x_2, x_3, x_4, x_5$ |
| Ant. 2 | : | $z_1, z_2, z_3$ |

METHOD OF INVENTORY CONTROL AND SYSTEM THEREOF

TECHNICAL FIELD

The present invention generally relates to a method of inventory control and an inventory control system for an inventory including sequentially arranged items, such as, but not limited to, articles in a library.

BACKGROUND

Various environments, such as libraries, warehouses, or retail stores, face an enormous task of maintaining and controlling large inventories of items (e.g., articles such as books in a library or items of goods in a warehouse or in a retail store). In this regard, conventional inventory control systems have utilized radio frequency identification (RFID) technology to assist in inventory control. In general, RFID technology uses electromagnetic fields to identify or detect RFID tags associated with (e.g., attached to or inserted in) items (or simply referred to as "tagged items" herein).

For example, to identify or detect tagged items, a RFID reader (which may also be referred to herein as a "RFID scanner") may scan through tagged items (at a distance from the tagged items within the detection range of the RFID reader) to send a radio frequency (RF) signal to interrogate the tagged items. In this regard, each RFID tag associated with an item has an item identification information relating to the item electronically stored therein, such as, an identifier for identifying the item amongst the items in the inventory. Therefore, during a scanning operation by a RFID reader, each RFID tag receiving the RF signal is configured to respond to the RF signal with a response signal, which includes the item identification information of the associated item, to the RFID reader. The item identification information received by the RFID reader from scanning the tagged items may then be used to assist in inventory control, such as by comparing the item identification information received with a database (comprising item identification information associated with tagged items desired to be identified and/or tracked) to identify the presence or absence of tagged items in the inventory for various purposes.

As an example, in a library environment, articles such as books, journals, and audio and/or visual products, may be arranged in sequence (in a particular order), such as based on their classifications (e.g., types of article and/or genre) and bibliographic information (e.g., author and/or title of the article). In this regard, an item identification information, such as a call number or book index, may be generated for each article based on such classifications and bibliographic information, and assigned thereto. Therefore, an article may be uniquely identified by the item identification information. Accordingly, articles in a library may be arranged in sequence based on the articles' associated item identification information, and are typically located on bookshelves arranged at various locations in the library. Each bookshelf typically has multiple rows of shelves (e.g., multiple tiers of shelves or compartments) on which articles may be placed. Furthermore, articles desired to be identified or detected in the library may each have a RFID tag associated thereto (e.g., attached thereto or inserted therein), whereby each RFID tag has stored therein the item identification information of the associated article. In this regard, the RFID-tagged articles (or simply referred to herein as "tagged articles") arranged in a sequence on a bookshelf and may be readily scanned by a RFID reader.

For example, the presence of one or more of tagged articles in the library may be detected by scanning the tagged articles in the library to obtain the item identification information of the tagged articles that have been scanned and looking up the database for a match. In this manner, one or more tagged articles that are missing from the library may also be identified by comparing the item identification information of the tagged articles obtained from the scan with the item identification information stored in the database.

Therefore, conventional inventory control techniques utilizing RFID technology may be able to detect the presence or absence of particular tagged items in an environment, such as articles in a library. However, various environments may require the items be arranged in sequence (e.g., in a particular or predetermined order), such as to facilitate in locating the items. However, such conventional techniques utilizing RFID technology generally have not been found to be able to, or at least not efficiently able to, detect items that are misplaced within the environment, such as an item, although present in the environment, is positioned out of sequence or not conforming with a particular or predetermined order imposed in the environment. As an example, articles in a library are arranged in sequence on shelves, but such conventional techniques generally are not able to, or at least not efficiently able to, detect, for example, whether any of the articles arranged in a row on a shelf is misplaced within the row. This leads to various problems, such as not being able to locate misplaced articles, which may then be presumed to be lost until discovered at a later stage, such as during a manual full inventory check. The need to perform frequent manual full inventory checks may also be undesirable since they are time consuming, tedious, and expensive to perform (e.g., due to labour cost), as well as being prone to human errors.

A need therefore exists to provide a method of inventory control and an inventory system that seeks to overcome, or at least ameliorate, one or more of the deficiencies of conventional inventory control methods and systems, such as to enable misplaced items in an environment to be determined or detected in an efficient manner. It is against this background that the present invention has been developed.

SUMMARY

According to a first aspect of the present invention, there is provided a method of inventory control for an inventory comprising items sequentially arranged on one or more structures, each of the items having a radio frequency tag associated thereto, the radio frequency tag having stored therein an identifier for identifying the item associated thereto, the method comprising:

obtaining data in relation to a plurality of items arranged in a row on a structure, the data comprising a plurality of sets of identifiers detected from interrogating the radio frequency tags of the plurality of items at a plurality of instances along the row, each set of identifiers being detected at a respective instance of the plurality of instances along the row;

determining a sequence of detected items in the row based on the data obtained, the sequence comprising estimated relative positions of the detected items in the row; and determining whether an item of the detected items in the row is misplaced based on the estimated relative position of the item in the row and a reference relative position of the item in the row.

In various embodiments, said determining a sequence of detected items comprises, for each of the detected items in the row, estimating relative position of the item in the row based on each of one or more instances of the plurality of instances along the row in which the identifier of the item has been detected to produce the estimated relative position of the item in the row.

In various embodiments, the plurality of instances along the row is associated with a series of increasing or decreasing numbers, respectively, and the relative position of the item in the row is estimated based on each of one or more numbers associated with the respective one or more instances of the plurality of instances along the row in which the identifier of the item has been detected.

In various embodiments, the relative position of the item in the row is estimated based on an average of the one or more numbers associated with the respective one or more instances of the plurality of instances along the row in which the identifier of the item has been detected.

In various embodiments, said determining whether an item of the detected items in the row is misplaced comprises:

determining a difference between the estimated relative position of the item in the row and the reference relative position of the item in the row; and determining whether the item is misplaced based on whether the difference is more than a predetermined threshold.

In various embodiments, the method further comprises:

obtaining one or more additional data in relation to respective one or more pluralities of items arranged in respective one or more additional rows on the structure, each additional data comprising a plurality of sets of identifiers detected from interrogating the radio frequency tags of the plurality of items at a plurality of instances along the respective additional row, each set of identifiers being detected at a respective instance of the plurality of instances along the respective additional row; and determining, for each identifier detected in the data associated with the row, whether the item corresponding to the identifier belongs to the row based on the data and the one or more additional data obtained, wherein the items determined to belong to the row constitute the detected items in the row.

In various embodiments, said determining, for each identifier detected in the data associated with the row, whether the item corresponding to the identifier belongs to the row is based on the respective number of times the identifier has been detected in the data associated with the row and the one or more additional data associated with the one or more additional rows.

In various embodiments, said determining, for each identifier detected in the data associated with the row, whether the item corresponding to the identifier belongs to the row comprises:

determining a presence indicator with respect to the item for each of a plurality of rows comprising the row and the one or more additional rows, respectively, the presence indicator providing a measure of a presence of the item in the respective row; and determining whether the item corresponding to the identifier belongs to the row based on a comparison of the presence indicators determined for the plurality of rows.

In various embodiments, the plurality of instances along each of the plurality of rows is associated with a series of increasing or decreasing numbers, respectively, and said determining a presence indicator with respect to the item for each of a plurality of rows comprises determining the presence indicator with respect to the item for a row of the plurality of rows based on a plurality of deviation values, each deviation value being determined based on a difference between a respective one of the numbers associated with instances of the plurality of instances along the row in which the identifier has been detected and an average of said numbers.

In various embodiments, the row and the one or more additional rows correspond to shelves of a structure, respectively, at different tiers thereof, and the one or more additional rows are located adjacent the row.

According to a second aspect of the present invention, there is provided an inventory control system for an inventory comprising items sequentially arranged on one or more structures, each of the items having a radio frequency tag associated thereto, the radio frequency tag having stored therein an identifier for identifying the item associated thereto, the system comprising:

a memory; and at least one processor coupled to the memory and configured to:

obtain data in relation to a plurality of items arranged in a row on a structure, the data comprising a plurality of sets of identifiers detected from interrogating the radio frequency tags of the plurality of items at a plurality of instances along the row, each set of identifiers being detected at a respective instance of the plurality of instances along the row;

determine a sequence of detected items in the row based on the data obtained, the sequence comprising estimated relative positions of the detected items in the row; and determine whether an item of the detected items in the row is misplaced based on the estimated relative position of the item in the row and a reference relative position of the item in the row.

In various embodiments, said determine a sequence of detected items comprises, for each of the detected items in the row, estimating relative position of the item in the row based on each of one or more instances of the plurality of instances along the row in which the identifier of the item has been detected to produce the estimated relative position of the item in the row.

In various embodiments, the plurality of instances along the row is associated with a series of increasing or decreasing numbers, respectively, and the relative position of the item in the row is estimated based on each of one or more numbers associated with the respective one or more instances of the plurality of instances along the row in which the identifier of the item has been detected.

In various embodiments, the relative position of the item in the row is estimated based on an average of the one or more numbers associated with the respective one or more instances of the plurality of instances along the row in which the identifier of the item has been detected.

In various embodiments, said determine whether an item of the detected items in the row is misplaced comprises:

determining a difference between the estimated relative position of the item in the row and the reference relative position of the item in the row; and determining whether the item is misplaced based on whether the difference is more than a predetermined threshold.

In various embodiments, the at least one processor coupled to the memory is further configured to:

obtain one or more additional data in relation to respective one or more pluralities of items arranged in respective one or more additional rows on the structure, each additional data comprising a plurality of sets of identifiers detected from interrogating the radio frequency tags of the plurality of items at a plurality of instances along the respective additional row, each set of identifiers being detected at a respective instance of the plurality of instances along the respective additional row; and determine, for each identifier detected in the data associated with the row, whether the item corresponding to the identifier belongs to the row based on the data and the one or more additional data obtained, wherein the items determined to belong to the row constitute the detected items in the row.

In various embodiments, whether the item corresponding to the identifier belongs to the row is determined based on the respective number of times the identifier has been detected in the data associated with the row and the one or more additional data associated with the one or more additional rows.

In various embodiments, said determine, for each identifier detected in the data associated with the row, whether the item corresponding to the identifier belongs to the row comprises:

determining a presence indicator with respect to for the item for each of a plurality of rows comprising the row and the one or more additional rows, respectively, the presence indicator providing a measure of a presence of the item in the respective row; and determining whether the item corresponding to the identifier belongs to the row based on a comparison of the presence indicators determined for the plurality of rows.

In various embodiments, the plurality of instances along each of the plurality of rows is associated with a series of increasing or decreasing numbers, respectively, and said determine a presence indicator with respect to the item for each of a plurality of rows comprises determining the presence indicator with respect to the item for a row of the plurality of rows based on a plurality of deviation values, each deviation value being determined based on a difference between a respective one of the numbers associated with instances of the plurality of instances along the row in which the identifier has been detected and an average of said numbers.

According to a third aspect of the present invention, there is provided a computer program product, embodied in one or more non-transitory computer-readable storage mediums, comprising instructions executable by at least one processor to perform the method of inventory control for an inventory comprising items sequentially arranged on one or more structures, each of the items having a radio frequency tag associated thereto, the radio frequency tag having stored therein an identifier for identifying the item associated thereto, the method comprising:

obtaining data in relation to a plurality of items arranged in a row on a structure, the data comprising a plurality of sets of identifiers detected from interrogating the radio frequency tags of the plurality of items at a plurality of instances along the row, each set of identifiers being detected at a respective instance of the plurality of instances along the row;

determining a sequence of detected items in the row based on the data obtained, the sequence comprising estimated relative positions of the detected items in the row; and determining whether an item of the detected items in the row is misplaced based on the estimated relative position of the item in the row and a reference relative position of the item in the row.

BRIEF DESCRIPTION OF THE DRAWINGS

Embodiments of the present invention will be better understood and readily apparent to one of ordinary skill in the art from the following written description, by way of example only, and in conjunction with the drawings, in which:

FIG. 8 depicts an exemplary output by a RFID reader from scanning of a single row (e.g., single tier) according to various example embodiments of the present invention;

DETAILED DESCRIPTION

Figure 1:
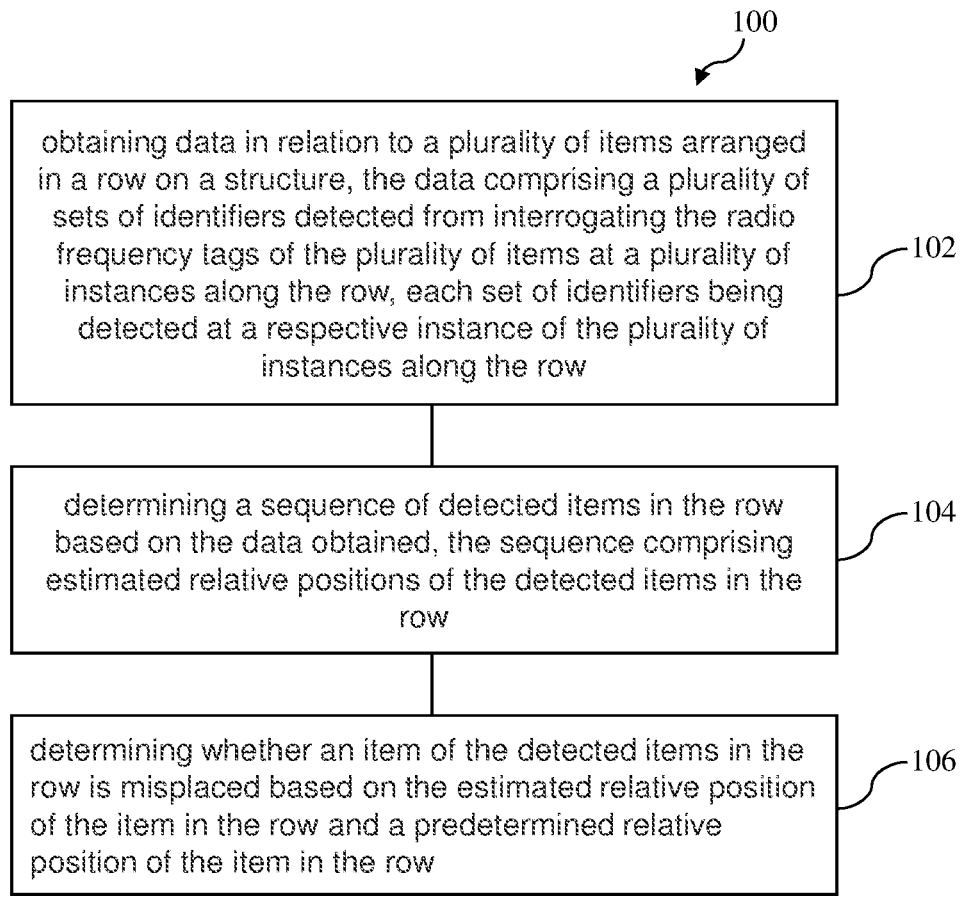
FIG. 1 depicts a schematic flow diagram of a method of inventory control according to various embodiments of the present invention.

Various embodiments of the present invention provide a method of inventory control and an inventory control system for an inventory comprising items sequentially arranged on one or more structures. By way of examples only and without limitation, the inventory may be in relation to any types of environments as applicable or as appropriate, as long as items are generally required or desired to be arranged in sequence (e.g., in a particular or predetermined order), such as but not limited to, a library, a warehouse, or a retail store. The structures may also be any structures known in the art configured to or capable of holding or storing items thereon. For example and without limitation, the structures may be any shelving structures as appropriate, such as but not limited to, bookshelves in a library, and retail shelves or racks in a retail store. Each shelving structure (shelf) may have multiple rows of shelves (e.g., multiple tiers of shelves or compartments) on which items may be placed.

It will be appreciated by a person skilled in the art that the inventory may comprise any items as appropriate or applicable for the type of environment, and the items may include various types of items. By way of examples only and without limitation, in a library environment, the inventory may include various types of articles, such as books, journals, and audio and/or visual products, and in a grocery retail environment, the inventory may include various types of items of goods.

In various embodiments, radio frequency identification (RFID) technology is utilized or implemented. In particular, each item desired to be detected and/or tracked has a radio frequency tag (RFID tag or may be simply referred to as "tag" herein) associated thereto (e.g., attached thereto or inserted therein), which may herein be referred to as a "tagged item". In this regard, the tag has electronically stored therein an identifier (item identification information) for identifying the item associated thereto. In this regard, an identifier may be generated for and assigned to each item desired to be identified and/or tracked, such as a sequence of numbers or digits. The identifier may also be encoded into a code, such as a barcode or a QR code.

For example and without limitation, in a library environment, the identifier for an article may be generated based on the article's classification (e.g., types of article and/or genre) and bibliographic information (e.g., author, title, publisher, place of publication, and/or date of publication of the article), such as a call number or book index. Therefore, the identifier for an article may be a unique identifier for uniquely identifying the article amongst articles in an inventory desired to be detected and/or tracked. Therefore, to detect the tagged items, a RFID reader (which may also be referred to as RFID scanner or antenna herein) may scan through the tagged items (at a distance from the tagged items within the detection range of the RFID reader) to send a radio frequency (RF) signal to interrogate the tagged items. Each RFID tag that receives the RF signal would then respond with a response signal, including the identifier of the tagged item, to the RFID reader. The tagged items arranged on one or more structures may thus be identified or detected based on the identifiers received from the scanning process.

Accordingly, the presence or absence of particular tagged items in an environment may be determined or detected based on the identifiers obtained in the response signals from the tagged items scanned in the environment. For example, the identifiers obtained may be compared with a database of identifiers of tagged articles desired to be detected or tracked in the environment.

As mentioned in the background, various environments may require the items be arranged in sequence (e.g., in a particular or predetermined order), such as to facilitate in locating the items. In this regard, various embodiments of the present invention advantageously provide a method of inventory control for an inventory comprising items sequentially arranged on one or more structures, and more particularly, capable of determining whether one or more tagged items are misplaced, such as being out of sequence or not conforming with a particular or predetermined order imposed in the environment. Accordingly, in various embodiments, not only is the presence or absence of tagged items in an environment able to be determined based on RFID technology, misplaced tagged items are also advantageously able to be determined based on RFID technology. Various embodiments of the present invention thus advantageously reduce or eliminate the need to perform manual full inventory checks (e.g., physically or manually checking each item in the inventory to determine whether any items are missing and/or misplaced), resulting in significant savings in inventory upkeep time and costs, as well as an improvement in detection accuracy. For example, manual full inventory checks by humans may be prone to errors since such a task is time consuming and tedious, and thus it may not be uncommon for humans to fail to notice that one or more items that are missing and/or are out of sequence. Accordingly, various embodiments of the present invention advantageously facilitate and improve the upkeep of inventory comprising sequentially arranged items in various environments, such as improved or more efficient identification of missing and/or misplaced items so that appropriate alerts may be issued to resolve the identified problem promptly.

FIG. 1 depicts a schematic flow diagram of a method 100 of inventory control according to various embodiments of the present invention for an inventory comprising items sequentially arranged on one or more structures, each of the items having a radio frequency tag associated thereto, the radio frequency tag having stored therein an identifier for identifying the item associated thereto. The method 100 includes a step 102 of obtaining data in relation to a plurality of items arranged in a row on a structure, the data comprising a plurality of sets of identifiers detected from interrogating the radio frequency tags of the plurality of items at a plurality of instances along the row, each set of identifiers being detected at a respective instance of the plurality of instances along the row, a step 104 of determining a sequence of detected items in the row based on the data obtained, the sequence comprising estimated relative positions of the detected items in the row, and a step 106 of determining whether an item of the detected items in the row is misplaced based on the estimated relative position of the item in the row and a reference relative position of the item in the row. In various embodiments, the reference relative position of the item in a row may be a predetermined relative position obtained from a database of identifiers corresponding to tagged items, and their associated predetermined relative position in their respective row.

Accordingly, various embodiments of the present invention determines whether an item is misplaced amongst a plurality of items arranged in a row (e.g., out of sequence or not in accordance with a particular or predetermined order that the items are supposed to be arranged in, such as imposed by the environment) based on data obtained in relation to the plurality of items arranged in the row. In particular, the data comprises a plurality of sets of identifiers detected from interrogating the radio frequency tags of the plurality of items at a plurality of instances along the row. More specifically, the plurality of items are interrogated (by a radio frequency reader) at a plurality of instances along the row, and at each of the plurality of instances, a set of identifiers are detected, and the above-mentioned data comprises such multiple sets of identifiers detected at the plurality of instances, respectively, along the row.

In various embodiments, the plurality of instances may be at regular intervals (or distance apart) from one point in the row (e.g., a first end or edge, such as the left end if the scanning motion is performed from the left end) to another point in the row (e.g., a second end or edge, such as the right end). In various embodiments, the intervals may be determined based on the detection range of the RFID reader used in the scanning process. As can be understood by a person skilled in the art, the detection range of the RFID reader depends on the output power at which it is designed to transmit the interrogating signal (RF signal). For example, a RFID reader configured with higher power has a larger detection range, and thus may be able to detect a larger number of tagged items at each instance. On the other hand, a RFID reader configured with lower power has a lower detection range, and thus may only be able to detect a smaller number of tagged items at each instance. Furthermore, in practice, regulations typically impose a maximum limit that a RFID reader may be designed to output power (maximum output power limit) in order to prevent exposure to undesirably high level of radiation associated with the RF signal emitted by the RFID reader. In various embodiments, the regular interval may be configured to provide a certain or predetermined amount of overlap between the detection ranges of two consecutive scans (or adjacent scans) along a row. In various embodiments, the regular interval (or distance apart) may be configured based on the detection range of the RFID reader, for example, such that the interval is about the same as a radius of the detection range. In various embodiments, the regular interval may be configured to perform scanning along the row as frequently as possible, for example, in order to provide as much overlap between every two adjacent scans. For example, doing so maximizes the amount of data obtained in relation to the plurality of items arranged in the row for subsequent processing, which improves performance as a result.

Furthermore, various embodiments of the present invention determine a sequence of the detected items in the row (items detected or determined to be in the row, such as based on the row detection technique as will be described in further detail later according to example embodiments of the present invention) based on the above-mentioned data obtained. For example, a single row sequencing technique may be provided to determine the sequence of the detected items in the row as will be described in further detail later according to example embodiments of the present invention. In other words, based on the above-mentioned data obtained, a sequence or an order of the detected items in the row is determined. In particular, the sequence is derived by determining the relative positions (e.g., relative order or relative sequence, such as represented by numbers) of the detected items in the row, and then ordered based on their relative positions determined (e.g., in ascending order) to produce the sequence of detected items. With the sequence of detected items in the row determined from the above-mentioned data, whether any of the detected items in the row is misplaced may then be determined based on (e.g., by comparing) the estimated relative position of the item in the row and a reference (e.g., predetermined or expected) relative position of the item in the row. For example, the reference relative position of the item may be obtained from a database having stored therein identifiers of all tagged items desired to be detected and/or tracked and their associated predetermined or expected relative position in the respective row.

Accordingly, in various embodiments, the database does not store the absolute predetermined locations of the tagged items, but instead stores the reference relative positions of the tagged items in the respective row (e.g., with respect to each row or with respect to each structure (e.g., shelving structure) comprising multiple row on which tagged items are arranged). As a non-limiting example for illustration purpose only, for a particular row or structure, the reference relative positions of the tagged items stored in the database may be "1" for a first book, "2" for a second book, "3" for a third book, 4 for a fourth book, and so on. Therefore, the estimated relative position for an item in a row or structure (e.g., "2.3" for the second book) may be compared with the reference relative position of the item stored in the database so as to determine whether the book is in misplaced. For example, if the estimated relative position of "2.3" for the second book is within a predetermined threshold from the reference relative position of "2" for the second book, the second book may then be determined to be in the correct place or order (i.e., not misplaced).

In various embodiments, the database may be prepared based on identifiers (the item identification information) of the tagged items and a predetermined function or formula to produce the reference relative positions of the tagged items based on the identifiers of the tagged items. As a non-limiting example for illustration purpose only, in libraries, the identifier may be a call number or book index, which may be alphanumeric, such as but not limited to, AAA.000 to ZZZ.999. The identifier may be generated for each tagged item based on classifications (e.g., types of article and/or genre) and bibliographic information (e.g., author and/or title of the article) to produce a sequence of identifiers. For example, for each particular shelving structure, the range of identifiers associated with the shelving structure may be predetermined (e.g., known in advance). As a non-limiting example for illustration purpose only, a first shelving structure may be associated with identifiers ranging from AAA.000 to BBB.999, and a second shelving structure may be associated with identifiers ranging from CCC.000 to DDD.999, and so on. For example, the reference relative positions of the tagged items with respect to the first shelving structure may then be determined based on the sequence of identifiers of such tagged items on the first shelving structure. For example, the reference relative positions of the tagged items may be a series of increasing numbers corresponding to the sequence of identifiers (e.g., "1" for the first identifier in the sequence, "2" for the second identifier in the sequence, and so on). The reference relative positions of the tagged items with respect to other shelving structures may also be determined in a correspondingly manner. Similarly, in various embodiments, the reference relative positions of the tagged items with respect to a particular row in the first shelving structure may be determined based on the identifiers of such tagged items on the particular row of the first shelving structure.

As non-limiting examples for illustration purpose only, the reference relative positions of the tagged items on a shelving structure may be determined based on (1) prior knowledge of the sequence or range of identifiers of the tagged items on the shelving structure, or (2) by detecting identifiers of the first and last articles on the shelving structure and determining the sequence or range of the identifiers of the tagged items on the shelving structure based on the detected identifiers of the first and last articles. The former approach may be more accurate but data associated with the prior knowledge stored in a computer has to be updated if the locations of the items have been changed. The latter approach may be more efficient since the sequence or range of identifiers associated with a shelving structure may be determined when needed, and it is not necessary to update the above-mentioned data associated with the prior knowledge when changes are made to the locations of the items.

As mentioned hereinbefore, the shelving structure typically has multiple rows of shelves (e.g., multiple tiers of shelves or compartments) on which items may be placed. In various embodiments, for such a shelving structure, the sequence of identifiers associated with items located on respective rows in the shelving structure may be joined or concatenated into one row or one sequence. For example, in the case of the shelving structure having five rows of shelves, and the sequences of identifiers respectively associated the five rows of shelves may be joined from the first row to the fifth row in order. Accordingly, various data processing with respect to a shelving structure in embodiments of the present invention may be performed with respect to data (e.g., sequence of reference relative positions of the items associated with the shelving structure) associated with the shelving structure expressed as one combined row without loss of generality.

Accordingly, various embodiments of the present invention advantageously determine whether any item(s) of the detected items in the row has been misplaced based on the relative position of the item in the row determined, for example, rather than the absolute position of the item with respect to a fixed reference point in space. Such a technique has been found to facilitate the detection of misplaced item(s) in an efficient and accurate manner.

In various embodiments, the step 104 of determining a sequence of detected items comprises, for each of the detected items in the row, estimating relative position of the item in the row based on each of one or more instances of the plurality of instances along the row in which the identifier of the item has been detected to produce the estimated relative position of the item in the row. In other words, the identifier of the item may have been detected in a number of instances of the RFID reader interrogating the tagged items along the row, and the relative position of such an item in the row is estimated based on all of such instances in which the identifier of the item has been detected.

In various embodiments, the plurality of instances along the row is associated (e.g., assigned or represented) with a series of increasing or decreasing numbers, respectively. In other words, each instance along the row is associated with a corresponding number, and the series of numbers associated with the plurality of instances in time order may be increasing or decreasing as appropriate. As various embodiments of the present invention determine and utilize the relative positions of the items in the row (e.g., instead of absolute locations with respect to a reference point), any series of numbers may be used as long as they are increasing or decreasing, and preferably the series of numbers increment or decrement at a constant interval or rate. As an example and without limitation, the series of numbers may simply be 1, 2, 3, 4, 5, and so on for the first instance, the second instance, the third instance, the fourth instance, the fifth instance, and so on, respectively. The series of numbers may each also represent time information, such as the time at the respective instance or a time duration from (or elapsed time since) the commencement of scanning along the a row (e.g., since the first instance). The relative position of the item is then estimated based on each of one or more numbers associated with the respective one or more instances of the plurality of instances along the row in which the identifier of the item has been detected. In other words, the relative position of the item is estimated based on all the numbers respectively associated with all the instances along the row in which the identifier corresponding to the item has been detected.

In various embodiments, the relative position of the item in the row is estimated based on an average of the one or more numbers associated with the respective one or more instances of the plurality of instances along the row in which the identifier of the item has been detected. In other words, the relative position of the item is estimated based on an average of all the numbers respectively associated with all the instances along the row in which the identifier corresponding to the item has been detected. For example and without limitation, following on from the above example, if the item is detected in the first to fourth instances, the relative position may be estimated to be 2.5 (i.e., average of the numbers 1, 2, 3, and 4).

In various embodiments, the above-mentioned step 106 of determining whether an item of the detected items in the row is misplaced comprises determining a difference between the estimated relative position of the item in the row and the reference relative position of the item in the row, and determining whether the item is misplaced based on whether the difference is more than a predetermined threshold. In this regard, the item may be determined to be misplaced if the difference is more than the predetermined threshold. For example and without limitation, the predetermined threshold may be set empirically based on various factors such as user preference, a given set of operating conditions, for example, transmission power of the RFID reader(s), moving speed of the RFID reader, and so on. In practice, the identifiers are detected based on a wireless system and there are randomness arising from different factors, such as types/quality of tags, speed of RFID reader(s) moving while scanning, power of the RFID reader(s), and so on. Accordingly, in various embodiments, the predetermined threshold may be determined based on a trade-off between false alarm probability (e.g., likelihood of an item being detected as being mis-sequenced even though the item is not) and wrong detection probability (e.g., likelihood of an item being detected as being in the correct sequence even though is the item is mis-sequenced). The predetermined threshold may also be configured by taking into account that setting a low threshold leads to less books being detected as mis-sequenced, meaning low false-alarm and high wrong-detection probabilities, and on the other hand, setting a high threshold leads to more books being detected as mis-sequenced, meaning high false-alarm and low wrong detection probabilities.

In various embodiments, the method 100 further comprises obtaining one or more additional data in relation to respective one or more pluralities of items arranged in respective one or more additional rows on the structure, each additional data comprising a plurality of sets of identifiers detected from interrogating the radio frequency tags of the plurality of items at a plurality of instances along the respective additional row, each set of identifiers being detected at a respective instance of the plurality of instances along the respective additional row. In other words, one or more additional data may be obtained, each additional data being in relation to a plurality of items arranged in a respective additional row on the structure. Furthermore, the plurality of items are interrogated (by a radio frequency reader) at a plurality of instances along the respective additional row, and at each of the plurality of instances, a set of identifiers are detected, and the additional data comprises such multiple sets of identifiers detected at the plurality of instances, respectively, along the respective additional row.

In various embodiments, the above-mentioned row and the above-mentioned one or more additional rows correspond to shelves of a structure, respectively, at different tiers thereof. Furthermore, the one or more additional rows are located adjacent (immediately adjacent) the row. For example, a shelving structure may have multiple rows of shelves (e.g., multiple tiers of shelves or compartments) on which items may be placed. In this regard, in various embodiments, determining, for each identifier detected in the data associated with the row, whether the item corresponding to the identifier belongs to the row based on the data and the one or more additional data obtained. In this regard, the items determined to belong to the row constitute the above-mentioned detected items in the row. Accordingly, various embodiments of the present invention advantageously determine whether the tagged item corresponding to an identifier detected when scanning at instances along a row actually belongs to that row.

For example, when a RFID reader traverses in a direction along a row to interrogate the tagged items along the row, identifiers of the tagged items in the row will be obtained, as well as the possibility of receiving identifiers of tagged items in adjacent rows (e.g., rows of tagged items immediately above and below the current row being scanned) depending on the detection range of the RFID reader. Therefore, an identifier received when scanning at instances along a particular row may not necessarily mean that the item corresponding to the identifier actually belongs to that particular row, and may instead be from an adjacent or nearby row. Various embodiments of the present invention advantageously addresses, or at least mitigates, such a problem by determining whether the items corresponding to identifiers detected when scanning at instances along a row actually belongs to that row based on the above-mentioned data associated with that row and the above-mentioned one or more additional data associated with the one or more additional rows. In various example embodiments, a row detection technique is provided to determine whether the items corresponding to identifiers detected when scanning at instances along a row actually belongs to that row and will be described in further detail later according to example embodiments of the present invention.

In various embodiments, the above-mentioned step of determining, for each identifier detected in the data associated with the row, whether the item corresponding to the identifier belongs to the row is based on the respective number of times (frequency) the identifier has been detected in the data associated with the row and the one or more additional data associated with the one or more additional rows. In other words, for a particular identifier, the number of times a particular identifier has been detected from scanning at instances along a particular row is compared with the number of times the particular identifier has been detected from scanning at instances along an additional row (e.g., adjacent row), for one or more additional rows. For example, the row in which the identifier has been detected the most number of times (i.e., highest count) amongst the rows being compared (candidate rows) may then be determined to be the row which the item corresponding to the identifier belongs to.

In various embodiments, the above-mentioned step of determining, for each identifier detected in the data associated with the row, whether the item corresponding to the identifier belongs to the row comprises determining a presence indicator with respect to the item for each of a plurality of rows comprising the row and the one or more additional rows, respectively, the presence indicator providing a measure of a presence of the item in the respective row, and determining whether the item corresponding to the identifier belongs to the row based on a comparison of the presence indicators determined for the plurality of rows (candidate rows). For example and without limitation, the presence indicator with respect to an item for a row may be expressed as a numerical value.

In various embodiments, the plurality of instances along each of the plurality of rows is associated with a series of increasing or decreasing numbers, respectively. That is, for each of the plurality of rows, the plurality of instances along the row is associated with a series of increasing or decreasing numbers, such as in the same manner as described hereinbefore. The above-mentioned step of determining a presence indicator with respect to the item for each of a plurality of rows comprises determining the presence indicator with respect to the item for a row (e.g., a row in which the identifier corresponding to the item has been detected multiple times) of the plurality of rows based on a plurality of deviation values. Each deviation value may be determined based on a difference between a respective one of the numbers associated with the instances of the plurality of instances along the row in which the identifier has been detected and an average of the above-mentioned numbers. Accordingly, various embodiments of the present invention advantageously determine a plurality of deviation values, one for each instance along the row in which the identifier has been detected, so as to take into account or obtain a measure of a spread of the instances along the row in which the identifier has been detected. In this regard, a wider spread of instances in which an identifier is detected along a row may increase the possibility that the item corresponding to the identifier belongs to the row. Accordingly, in such embodiments, to improve the accuracy of the measure of the presence of the item in a row, the presence indicator for the row takes into account not only the number of times an identifier has been detected in the row, but also the spread of the instances in which the identifier has been detected in the row.

Figure 2:
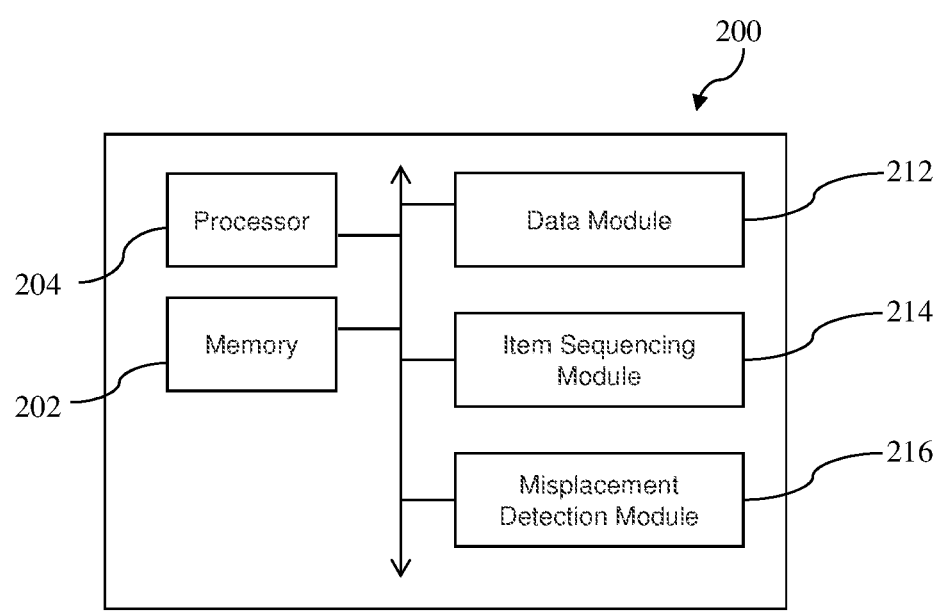
FIG. 2 depicts a schematic drawing of an inventory control system according to various embodiments of the present invention.

FIG. 2 depicts a schematic drawing of an inventory control system 200 according to various embodiments of the present invention for an inventory comprising items sequentially arranged on one or more structures, each of the items having a radio frequency tag associated thereto, the radio frequency tag having stored therein an identifier for identifying the item associated thereto. The system 200 comprises a memory 202, and at least one processor 204 coupled to the memory 202 and configured to: obtain data in relation to a plurality of items arranged in a row on a structure, the data comprising a plurality of sets of identifiers detected from interrogating the radio frequency tags of the plurality of items at a plurality of instances along the row, each set of identifiers being detected at a respective instance of the plurality of instances along the row; determine a sequence of detected items in the row based on the data received, the sequence comprising estimated relative positions of the detected items in the row; and determine whether an item of the detected items in the row is misplaced based on the estimated relative position of the item in the row and a reference relative position of the item.

It will be appreciated by a person skilled in the art that the at least one processor 204 may be configured to perform the required functions or operations through set(s) of instructions (e.g., software modules) executable by the at least one processor 204 to perform the required functions or operations. Accordingly, as shown in FIG. 2, the system 200 may further comprise a data module or circuit 212 configured to obtain data in relation to a plurality of items arranged in a row on a structure, the data comprising a plurality of sets of identifiers detected from interrogating the radio frequency tags of the plurality of items at a plurality of instances along the row, each set of identifiers being detected at a respective instance of the plurality of instances along the row; an item sequencing module or circuit (or item sequencer) 214 configured to determine a sequence of detected items in the row based on the data received, the sequence comprising estimated relative positions of the detected items in the row; and a misplacement detection module or circuit (or misplacement detector) 216 configured to determine whether an item of the detected items in the row is misplaced based on the estimated relative position of the item and a reference (e.g., expected) relative position of the item. Accordingly, the at least one processor 204 may be configured to be capable of executing computer-executable instructions (e.g., the data module 212, the item sequencing module 214, and/or the misplacement detection module 216) to perform one or more of the required or desired functions, and the memory (computer-readable storage medium) 202 may be communicatively coupled to the at least one processor 204 and may have stored therein one or more sets of computer-executable instructions (e.g., the data module 212, the item sequencing module 214, and/or the misplacement detection module 216).

In various embodiments, the system 200 corresponds to the method 100 as described hereinbefore with reference to FIG. 1, therefore, various functions or operations configured to be performed by the least one processor 204 may correspond to various steps of the method 100 described in hereinbefore, and thus need not be repeated with respect to the system 200 for clarity and conciseness.

A computing system, a controller, a microcontroller or any other system providing a processing capability may be presented according to various embodiments in the present disclosure. Such a system may be taken to include one or more processors and one or more computer-readable storage mediums. For example, the system 200 described hereinbefore may be a device or a system including a processor (or controller) 204 and a computer-readable storage medium (or memory) 202 which are for example used in various processing carried out therein as described herein. A memory or computer-readable storage medium used in various embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In various embodiments, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g., a microprocessor (e.g., a Complex Instruction Set Computer (CISC) processor or a Reduced Instruction Set Computer (RISC) processor). A "circuit" may also be a processor executing software, e.g., any kind of computer program, e.g., a computer program using a virtual machine code, e.g., Java. Any other kind of implementation of the respective functions which will be described in more detail below may also be understood as a "circuit" in accordance with various alternative embodiments. Similarly, a "module" may be a portion of a system according to various embodiments in the present invention and may encompass a "circuit" as above, or may be understood to be any kind of a logic-implementing entity therefrom.

Some portions of the present disclosure are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "obtaining", "determining", "computing", "comparing" or the like, refer to the actions and processes of a computer system, or similar electronic device, that manipulates and transforms data represented as physical quantities within the computer system into other data similarly represented as physical quantities within the computer system or other information storage, transmission or display devices.

The present specification also discloses a system or an apparatus for performing the operations/functions of the methods described herein. Such a system or apparatus may be specially constructed for the required purposes, or may comprise a general purpose computer or other device selectively activated or reconfigured by a computer program stored in the computer. The algorithms presented herein are not inherently related to any particular computer or other apparatus. Various general-purpose machines may be used with computer programs in accordance with the teachings herein. Alternatively, the construction of more specialized apparatus to perform the required method steps may be appropriate.

In addition, the present specification also at least implicitly discloses a computer program or software/functional module, in that it would be apparent to the person skilled in the art that the individual steps of the methods described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention. It will be appreciated by a person skilled in the art that various modules described herein (e.g., the data module 212, the item sequencing module 214, and/or the misplacement detection module 216) may be software module(s) realized by computer program(s) or set(s) of instructions executable by a computer processor to perform the required functions, or may be hardware module(s) being functional hardware unit(s) designed to perform the required functions. It will also be appreciated that a combination of hardware and software modules may be implemented.

Furthermore, one or more of the steps of a computer program/module or method described herein may be performed in parallel rather than sequentially. Such a computer program may be stored on any computer readable medium. The computer readable medium may include storage devices such as magnetic or optical disks, memory chips, or other storage devices suitable for interfacing with a general purpose computer. The computer program when loaded and executed on such a general-purpose computer effectively results in an apparatus that implements the steps of the methods described herein.

In various embodiments, there is provided a computer program product, embodied in one or more computer-readable storage mediums (non-transitory computer-readable storage medium), comprising instructions (e.g., the data module 212, the item sequencing module 214, and/or the misplacement detection module 216) executable by one or more computer processors to perform a method 100 of inventory control as described hereinbefore with reference to FIG. 1 and/or other method(s) described herein. Accordingly, various computer programs or modules described herein may be stored in a computer program product receivable by a system (e.g., a computer system or an electronic device) therein, such as the system 200 shown in FIG. 2, for execution by at least one processor of the system to perform the required or desired functions.

The software or functional modules described herein may also be implemented as hardware modules. More particularly, in the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the software or functional module(s) described herein can also be implemented as a combination of hardware and software modules.

Figure 3:
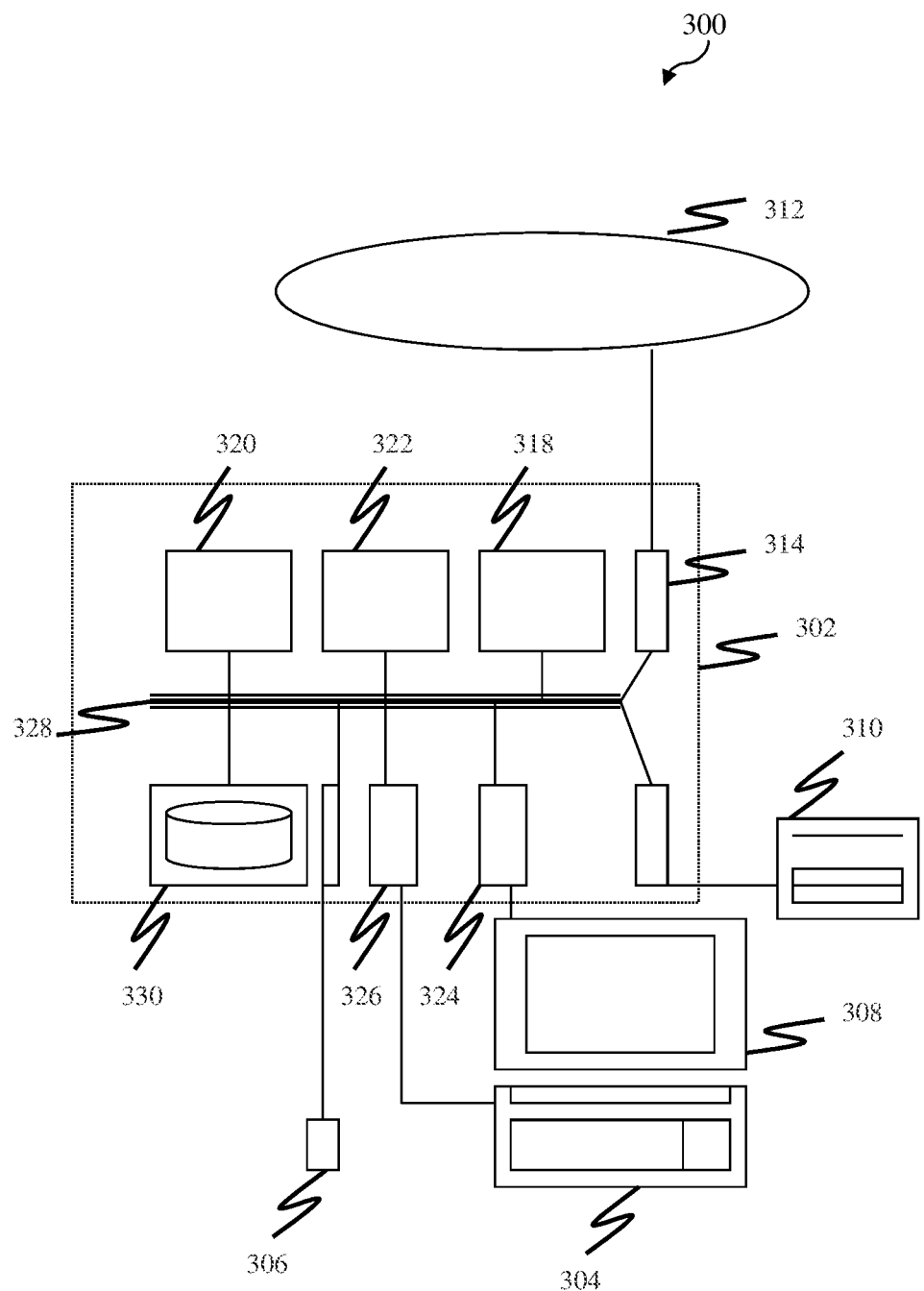
FIG. 3 depicts a schematic drawing of an exemplary computer system.

The methods or functional modules of the various embodiments as described herein may be implemented in the system 200, which may be realized by a computer system (e.g., portable or desktop computer system), such as a computer system 300 as schematically shown in FIG. 3 as an example only and without limitation. The method or functional module may be implemented as software, such as a computer program being executed within the computer system 300, and instructing the computer system 300 (in particular, one or more processors therein) to conduct the methods/functions of various embodiments described herein. The computer system 300 may comprise a computer module 302, input modules such as a keyboard 304 and mouse 306 and a plurality of output devices such as a display 308, and a printer 310. The computer module 302 may be connected to a computer network 312 via a suitable transceiver device 314, to enable access to e.g. the Internet or other network systems such as Local Area Network (LAN) or Wide Area Network (WAN). The computer module 302 in the example may include a processor 318 for executing various instructions, a Random Access Memory (RAM) 320 and a Read Only Memory (ROM) 322. The computer module 302 may also include a number of Input/Output (I/O) interfaces, for example I/O interface 324 to the display 308, and I/O interface 326 to the keyboard 304. The components of the computer module 302 typically communicate via an interconnected bus 328 and in a manner known to the person skilled in the relevant art.

It will be appreciated by a person skilled in the art that the terminology used herein is for the purpose of describing various embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 4:
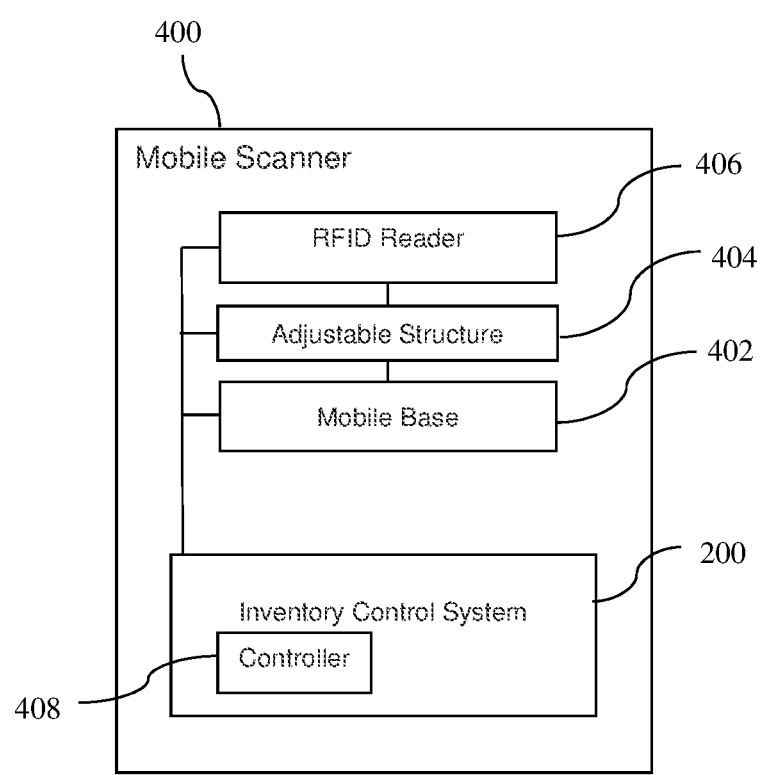
FIG. 4 depicts a schematic drawing of a mobile robotic scanning system including an inventory control system according to various embodiments of the present invention.

In various embodiments, the inventory control system 200 is implemented in a mobile robotic scanning system that is configured or programmed to move to predetermined locations in an environment to scan tagged items sequentially arranged on a number of structures in the environment, such as all the structures in the environment having tagged items arranged thereon. FIG. 4 depicts a schematic drawing of a mobile robotic scanning system (or simply referred to as a mobile scanner) 400 comprising an inventory control system 200 according to various embodiments of the present invention as described hereinbefore with reference to FIG. 2, a mobile base 402 configured to be movable (e.g., via wheels mounted thereon) in various directions to arrive at predetermined locations to scan tagged items, and an adjustable structure (e.g., adjustable arm) 404 arranged on or affixed to the mobile base 402 and configured to be adjustable in one or more directions (e.g., in the three dimensional space, including along the x-axis, y-axis, and/or z-axis) so as to move a RFID reader 406 attached thereto in such one or more directions for scanning the tagged items. It will be appreciated that the mobile base 402 movable in various directions includes the mobile base 402 being rotatable or orientatable about its vertical axis.

In various embodiments, the inventory control system 200 may further comprise a controller 408 configured to control the movement of the mobile base 402 to move to various desired or predetermined locations and to control the movement of the adjustable structure 404 to move the RFID reader 406 to various desired or predetermined positions for scanning the tagged items. For example, the controller 408 may control the mobile base 402 to move to a particular location along a shelving structure and may further control the adjustable structure 404 to move the RFID reader 406 to a desired height to position the RFID reader 406 to face a particular shelf having tagged items arranged in a row thereon desired to be scanned. For example, to scan the row of tagged items, the controller 408 may then control the mobile base 402 to traverse in a direction along the shelf, such as from one end (e.g., left end) to another end (e.g., right end) of the shelf.

In order that the present invention may be readily understood and put into practical effect, various example embodiments of the present invention will be described hereinafter by way of examples only and not limitations. It will be appreciated by a person skilled in the art that the present invention may, however, be embodied in various different forms or configurations and should not be construed as limited to the example embodiments set forth hereinafter. Rather, these example embodiments are provided so that this disclosure will be thorough and complete, and will fully convey the scope of the present invention to those skilled in the art.

In particular, for better understanding of the present invention and without limitation or loss of generality, various example embodiments of the present invention will now be described with respect to the items being articles, such as but not limited to books, journals, and audio and/or visual products, and the environment being a library. However, as mentioned hereinbefore, it will be appreciated by a person skilled in the art that the present invention is not limited to a library environment, and various other types of environments are also within the scope of the present invention, as long as items are generally required or desired to be arranged in sequence (e.g., in a particular or predetermined order), such as but not limited to, a warehouse or a retail store.

Figure 5:
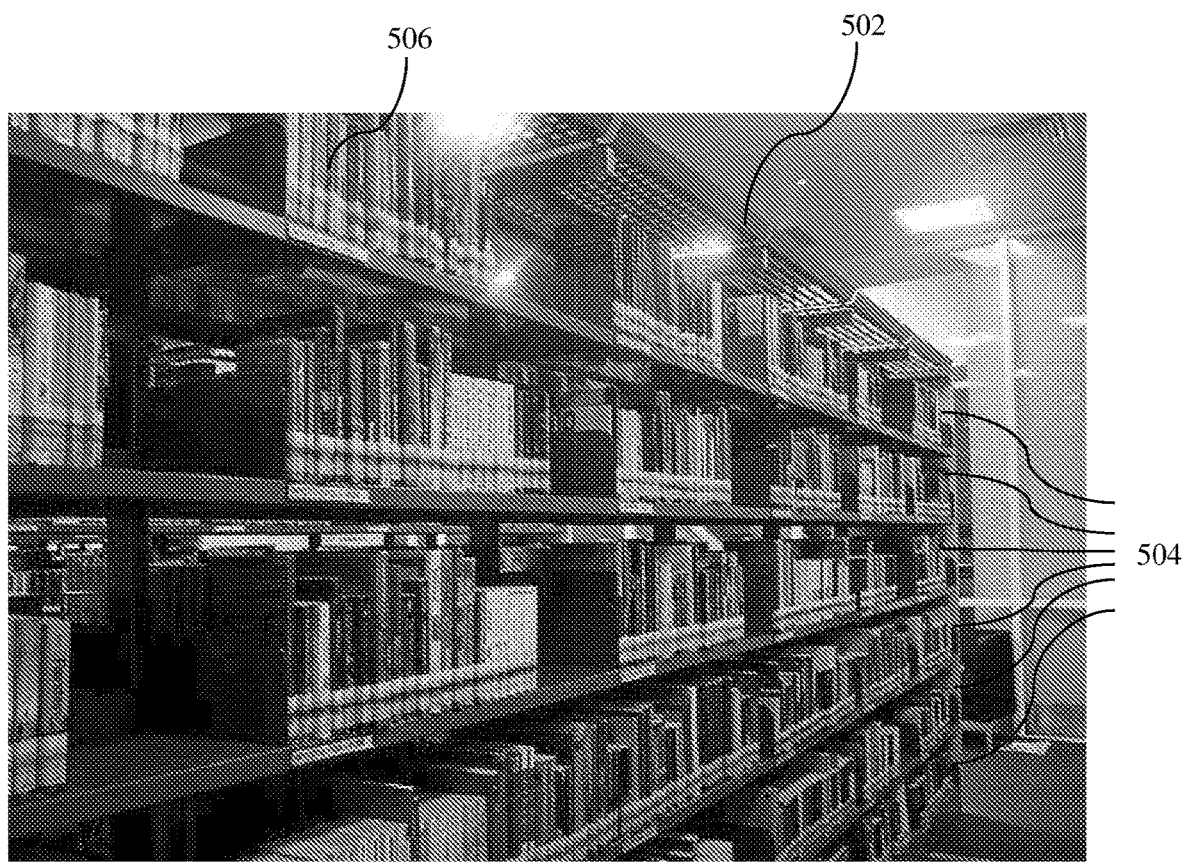
FIG. 5 depicts an image of a section of a library environment showing a shelving structure having multiple rows of shelves, and a typical arrangement of tagged articles on the shelves.

FIG. 5 depicts an image of a section of a library environment showing a shelving structure 502 having multiple rows (or tiers) of shelves 504, and a typical arrangement of tagged articles 506 on the shelves 504.

In various example embodiments, a method and a system for detecting the presence and/or misplacement of one or more tagged articles are provided, and in particular, a method and a system for detecting the presence and/or misplacement of tagged articles among tagged articles arranged in sequence (each tagged article being associated with a RFID tag). As shown in FIG. 5, as an example, the tagged article may be a book, and the books are arranged in sequence and physically located on one or more shelving structures 502 in a library, each having multiple rows (or tiers) of shelves 504.

The tagged articles sequentially arranged on a shelf 504 may be readily scanned either by a hand held RFID reader or a RFID reader mounted on a robotic platform, such as the mobile scanner 400 described hereinbefore with reference to FIG. 4. As described hereinbefore, in various embodiments, one or more additional data in relation to respective one or more pluralities of items arranged in respective one or more additional rows on a structure may be obtained. In this regard, multiple RFID readers, one for each row desired to be scanned simultaneously, may be mounted on the mobile scanner to scan multiple rows of the shelving structure 502 simultaneously. In various other example embodiments, a user with a handheld RFID reader may scan each row of the shelving structure 502 in an appropriate manner. For example, each row may be scanned from a left to right direction (forward direction), or from a right to left direction (reverse direction).

When a row is being scanned, the RFID reader may be configured to transmit a RF signal periodically to query articles within a detection range. All tagged articles within the detection range of the RFID reader are configured to respond to the RFID reader with a response signal, including their respective identifier. After the scanning process for a shelving structure is completed, data in relation to articles arranged on multiple rows of shelves (e.g., all rows) may be obtained. In particular, the data comprises, for each row, a plurality of sets of identifiers detected from interrogating the tags of the articles at a plurality of instances, respectively, along the row. That is, a set of identifiers detected at each instance along the row.

In various example embodiments, the scanning speed along a row may be substantially constant or may be not constant (e.g., variable). In the case of the scanning speed being variable, timing information associated with the identifiers (or time series of detected identifiers) may be obtained when detecting the identifiers. In this regard, the timing information may be used to improve the performance. For example, consider that the detection is performed at two speeds, a low speed of 0.1 m/s, and a high speed of 0.2 m/s. As a result, more data will be collected during the time period of low speeds, and may lead to a bias of the obtained results. In this case, the obtained results may be padded or interpolated to achieve a uniform spread of data. For example, the obtained results at 0.1 m/s for each instance may be repeated once, so that the same number of scans is obtained with respect to the scanning speed at 0.2 m/s.

Based on the above-mentioned data obtained, various example embodiments determine the actual row location (e.g., tier location) of the articles detected and the relative sequence (relative positions) of the articles in each row from the sets of identifiers detected or the time series of detected identifiers.

For example, in operation, the RFID reader at a first position along a row scans and receives a burst of detected identifiers (set or list of detected identifiers) corresponding to tagged articles. Subsequently, the RFID reader at a second position along the row scans and receives another burst of detected identifiers (another set or list of detected identifiers) corresponding to tagged articles. Similarly, further bursts of detected identifiers (further sets or lists of detected identifiers) are obtained for subsequent positions, respectively, along the row. As a result, a plurality of sets or lists of identifiers (or time series of identifiers) is produced or generated for the row.

For example, the RFID reader may be subjected to traverse along a direction (e.g., parallel to the shelf) from the first position for scanning the articles iteratively (e.g., at multiple instances regularly spaced apart). As a result, a burst of detected identifiers is received at each instance of scanning along the row to produce multiple sets of detected identifiers (time series of detected identifiers) corresponding to the tags of the articles scanned.

In various example embodiments, the scanning operation may be performed autonomously by a mobile scanner (e.g., the mobile scanner 400 as described hereinbefore with reference to FIG. 4) comprising a number of hardware components, including a mobile base, one or more readers or sensors for scanning the books, such as RFID reader antennas and/or cameras, a movable (adjustable) structure (e.g., a robotic arm) that is capable of moving the reader(s) in a number of directions, such as up or down to position the reader(s) at a desired row (or tier) of the shelving structure for scanning, or towards or away from the shelf.

Figure 6:
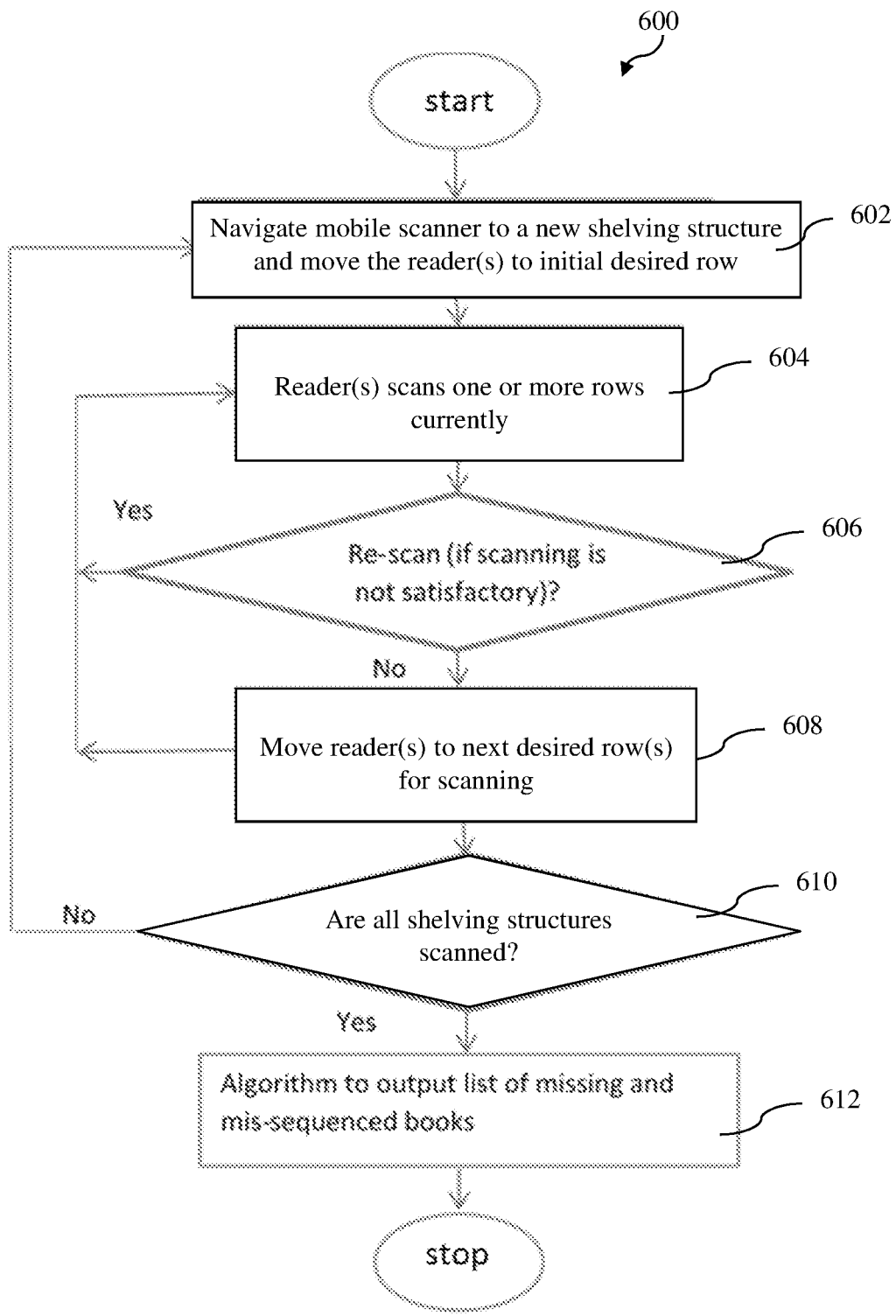
FIG. 6 depicts a schematic flow diagram illustrating a scanning method according to various example embodiments of the present invention by controlling operations of a mobile scanner.

FIG. 6 depicts a schematic flow diagram illustrating a scanning method 600 according to various example embodiments of the present invention by controlling operations of a mobile scanner (e.g., the mobile scanner 400 as shown in FIG. 4). At step 602, the mobile scanner may be controlled to navigate to a shelf to be scanned and to move the RFID reader(s) mounted thereon to an initial desired row (e.g., tier height) for scanning the tagged articles in that row (or tier), such as based on instructions stored in a memory and executable by a processor in the inventory control system to perform the controlling functions. For example, the mobile scanner may be controlled to navigate based on a predetermined path in which the mobile scanner is configured to follow. In various example embodiments, the mobile scanner's navigation may also be assisted by various location tags installed at various predetermined locations for the mobile scanner to navigate to, such as by the mobile scanner sensing various location tags installed.

At step 604, the RFID reader(s) may be controlled to scan one or more rows of the shelving structure concurrently. As an example, two RFID readers may be mounted on the mobile scanner and may be spaced apart by a distance based on or corresponding to the height of the shelf. The two RFID readers may thus be controlled to concurrently scan along two rows (adjacent rows) respectively, by controlling the mobile base to move in a direction parallel to the shelving structure, e.g., from one end of the row to another end of the row. The scanning motion may be along the shelf where the articles are placed, for example, the scanning may be performed from the left edge or end to the right or end edge of the shelf, or vice versa. It will be appreciated that more than two RFID readers may also be mounted on the mobile scanner for scanning more than two rows of articles concurrently.

At step 606, the data obtained from scanning the one or more rows may then be checked to determine whether the data is satisfactory. For example, whether the data is satisfactory may be determined based on whether error(s) exists in the output of the RFID reader(s) (data obtained) from the scanning, such as due to various possible issues (e.g., hardware issue) with the RFID reader(s) or undesirable external disturbances affecting the scanning process. If the data is satisfactory, the method may then proceed to the next step 608, otherwise, the one or more RFID readers are controlled to re-scan the one or more rows.

At 608, the RFID reader(s) may then be controlled to move to a subsequent row (or rows in the case of multiple RFID readers) desired to be scanned, such as by controlling the adjustable structure having the RFID reader(s) mounted thereon to move up or down. The RFID reader(s) may then be controlled to scan the one or more rows concurrently as described hereinbefore at step 604. In various example embodiments, the mobile scanner may be configured to scan the rows of articles on a shelving structure at any row order as desired without deviating from the scope of the present invention, such as but not limited to, from the lowest or bottom row to the highest or top row, or vice versa.

Steps 604, 606, and 608 may then repeat in a loop, moving from a row or rows to subsequent row or rows for scanning until all the rows of the current shelving structure having tagged articles arranged thereon have been scanned.

At step 610, it is determined whether all rows (e.g., tiers) of the current shelving structure having tagged articles arranged thereon have been scanned, and if so, the mobile scanner may be controlled to move to a new shelving structure (e.g., a next shelving structure as predetermined) to be scanned, and steps 602, 604, 606, and 608 as described above are repeated to scan the tagged articles on the new shelving structure. When the scanning of all shelving structures (e.g., all of the shelving structures desired to be scanned) have been completed, the data obtained from the scanning process may then be processed at step 612 (e.g., by the inventory control method 100 as described hereinbefore and further described below according to example embodiments) to determine whether any tagged articles are missing and/or misplaced.

In various example embodiments, the operations of the mobile scanner, such as the movement of the mobile scanner and the movement of the RFID reader(s) to scan the shelving structures, may optimized based on predetermined criteria, such as to minimize the time required to scan the tagged articles in the entire library.

With the above-mentioned data obtained from the scanning process, a method of inventory control is provided according to various example embodiments that seeks to produce a sequence of tagged articles detected. That is, the relative positions of the tagged articles detected with respect to one another are of interest, rather than the absolute positions of the tagged articles detected with respect to one or more fixed reference points in space.

In various example embodiments, the method of inventory control is configured to determine which row (e.g., tier) the tagged articles are at or belong to based on the data obtained from the scanning process, and then for each row, determine the relative positions of the tagged articles detected on that row (that is, sequencing the tagged articles detected). Therefore, it can be appreciated by a person skilled in the art that the method of inventory control according to various example embodiments is different from conventional localization techniques, which may be based on the absolute positions of the tagged articles with respect of one or more fixed reference points in space.

In various example embodiments, binary information is used to represent whether a tag is detected or not from the scanning process, that is, a binary information is used to indicate each tag's presence, such as binary "1" for a particular tag to indicate the presence of that particular tag, and binary "0" for a particular tag to indicate the absence of that particular tag. The wireless signal strength is typically not available in a commercial HF RFID reader, and hence binary information can be used. On the other hand, in a commercial UHF RFID system where the wireless signal strength is also available, the wireless signal strength is additionally used to improve the performance of the scanning process according to various example embodiments of the present invention.

Figure 7:
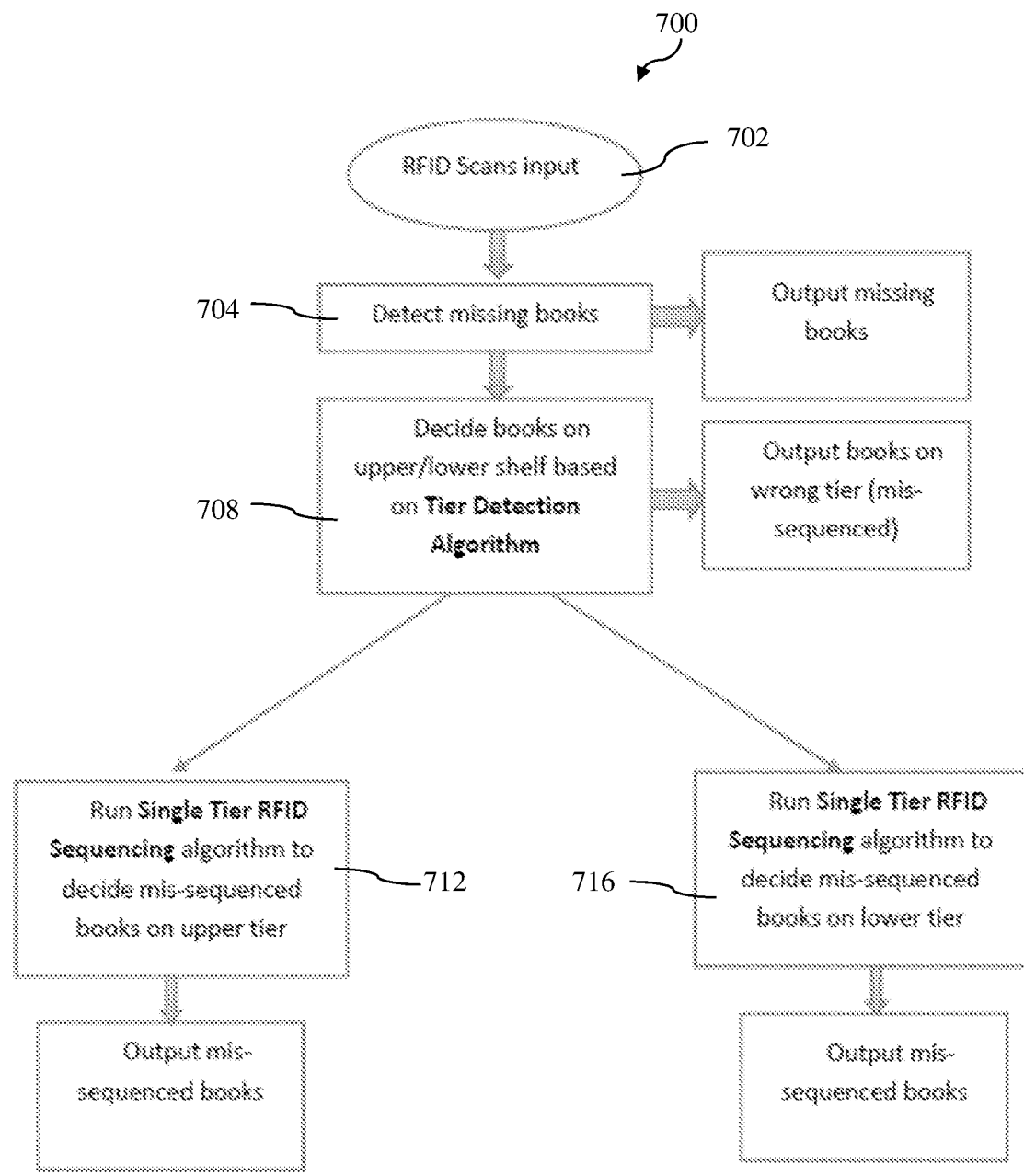
FIG. 7 depicts a schematic flow diagram of a method of inventory control according to various example embodiments of the present invention for an inventory comprising articles (e.g., books) sequentially arranged on one or more structures.

FIG. 7 depicts a schematic flow diagram of a method 700 of inventory control according to various example embodiments of the present invention for an inventory comprising articles (e.g., books) sequentially arranged on one or more structures. Each article has a tag (RFID tag) associated thereto, the tag having stored therein an identifier for identifying the item associated thereto.

As a first step 702, data from the above-mentioned scanning process is obtained (e.g., RFID scan input) so as to be processed by the method 700 to determine whether any tagged articles are missing and/or misplaced. As mentioned hereinbefore, the data comprises multiple sets of identifiers detected from interrogating the tagged articles at multiple instances, respectively, along each row of a shelving structure having tagged articles arranged thereon, for each shelving structure desired to be scanned in the environment. For example, the data obtained may comprise multiple set of identifiers detected from a full scan of the relevant shelving structures in the environment, such as in a library.

In step 704, missing articles may be detected from the data obtained in step 702. For example, missing articles may be identified and flagged by comparing the identifiers detected in the data obtained with the identifiers stored in a database comprising identifiers of articles desired to be identified and/or tracked. For example, the identifiers that can be found in the database but cannot be found in the data obtained from the scanning process may be determined to be missing. Indication of the missing articles may then be presented in any suitable format, such as a list of their identifiers (e.g., call numbers) and/or their bibliography information.

In various embodiments, sequencing the articles scanned (e.g., referred to as a RFID sequencing technique) may be considered to comprise two main components, namely, a first component being a row detection component (e.g., tier detection component) 708 (e.g., corresponding to the step of determining, for each identifier in the data associated with the row, whether the item corresponding to the identifier belongs to the row), and a second component being a single row sequencing component (e.g., single tier sequencing component) 712, 716 (e.g., corresponding to the step 104 described hereinbefore). The row detection component 708 may be configured to determine which row (e.g., tier) an article scanned is located at, and the single tier sequencing component 712, 716 may be configured to determine the relative positions of the articles (determined by the row detection component 708 to be located at a particular row) within that particular tier. The row detection component 708 may be implemented by a row detection technique or algorithm, and the single row sequencing component may be implemented by a single row sequencing technique or algorithm (or single row RFID sequencing technique or algorithm).

In various example embodiments, in relation to the row sequencing technique, a data pre-processing method or technique in which the data obtained from the scanning process is analyzed to determine the direction in which the scanning was performed to obtain the data, such as whether the scanning was performed in a direction from left to right (forward direction), or a direction from right to left (reverse direction) with respect to each row (e.g., each tier or shelf).

For better understanding of the present invention and without limitation or loss of generality, the inventory control method 700 will now be described with respect to the data in relation to one scan of one or more rows of a shelving structure. It will be appreciated to a person skilled in the art that additional rows of the shelving structure and other shelving structures in the library may also be scanned in the same or similar manner to obtain the corresponding data, and such data may also be processed in the same or similar manner to determine a sequence of the detected articles on each row and determine whether any of the articles in each row is missing and/or misplaced.

For each scan along a row (e.g., a tier or shelf), the RFID reader may be configured to query or interrogate the tagged articles along the row a certain number of times (plurality of instances). Let the total number of queries (e.g., a query may also be referred to herein as a "run" or an "instance") be denoted by M. During each query, a number of tags on a particular tier and possibly tags on adjacent tiers may respond to the query by the RFID reader. By way of an example, FIG. 8 shows an exemplary output by a RFID reader from scanning of a single row (e.g., single tier). In the example shown in FIG. 8, tags $T_1$, $T_2$, $T_4$, and $T_5$ were detected in the first query or instance, tags $T_1$, $T_2$, $T_3$, $T_5$, $T_6$, $T_8$, and $T_9$ were detected in the second query or instance, and so on, and $T_{195}$ and $T_{196}$ were detected in the last query or instance. In this regard, $T_i$ refers to the tag associated with or corresponding to article i. In the example, for example, $T_3$ was detected in the second query but not in the first query, and $T_4$ was detected in the first query but not in the second query. This is to illustrate a certain degree with randomness or uncertainty associated with the detection process. For example, the detection process may depend on environment factors, such as interference in the environment, the signal propagation environment, and so on. For example, when multiple tags are present, a collision avoidance method may be employed to increase the chance that only one tag transmit in any one time slot. However, in some cases, two or more tags may transmit concurrently leading to a collision, resulting in both tags not being detected by the RFID reader.

In the case of a shelving structure having multiple rows such as multiple tiers, articles belonging to different rows (e.g., adjacent rows) may respond to a RFID reader during a scan. In this regard, various example embodiments of the present invention address, or at least mitigate, this issue using the above-mentioned row detection technique so as to determine or decide which a tier each particular article detected during a scan actually belongs to.

For simplicity and clarity, the row detection technique will now be described in relation to two rows (e.g., adjacent rows). However, it will be appreciated by a person skilled in the art that the row detection technique is not limited to being applied to two rows, and may also be applied to more than two rows as appropriate, such as three rows (e.g., middle row and an adjacent row on either side of the middle row) or five rows (e.g., middle row and two adjacent rows on either side of the middle row).

In various example embodiments, to scan the two rows, two RFID readers may be provided for scanning the two rows simultaneously, such as a first RFID reader for scanning a first row of the two rows and a second RFID reader for scanning a second row of the two rows. For example, in the case of the two rows being two tiers, the first RFID reader may be provided for scanning an upper tier of the two tiers and the second RFID reader may be provided for scanning a lower tier of the two tiers. In various other example embodiments, only one RFID reader may be provided for scanning the two rows, such as sequentially, whereby the RFID reader is configured to scan one of the two rows and then move to scan the other one of the two rows.

The row detection technique is configured to then decide or determine whether each article belongs to the first or second row of the two rows individually, such as the upper or lower tier. In various example embodiments, the row detection technique is only applied to articles whose tags have been detected in both scanning of the two rows. Hence, for a particular article whose tag has been detected in both scanning of the two rows, let $x_i$ be the runs (which may be also referred to as queries or instances) in which the tag was detected when scanning the first row (e.g., upper tier). Similarly, let $z_i$ be the runs in which the tag was detected when scanning the second row (e.g., lower tier). For example, $x_i$ and $z_i$ may be obtained in the data obtained from the scanning process by checking at which run(s) the identifier of the article (denoted by $T_i$) appears in.

In various example embodiments, for simplicity and clarity, the run order or count (e.g., 1, 2, . . . , M) is considered when the RFID reader(s) is moved from a first end (e.g., left end) to a second end (e.g., right end) of each row, such as, with the number "1" being associated with the first scan at the first end and the number "M" (where "M" denotes the last run count) being the last scan at the second end. However, it will be appreciated that the plurality of instances of scanning along a row is not limited to being represented by a run count, and may be represented by other forms as appropriate as long as the numbers are increasing (or decreasing) to correspond to the plurality of instances (sequence of instances) along the tier at which the scanning were performed, such as but not limited to, timing information of each run or instance if available.

Figures 9, 10:
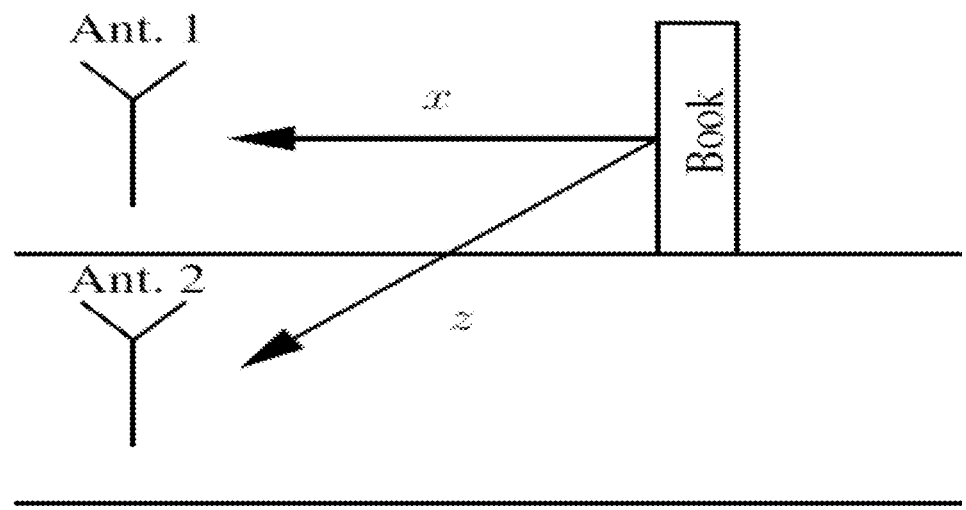
FIG. 9 depicts the instances at which the identifier corresponding to a particular article appears in the two scans along the first and second rows (e.g., upper and lower tiers, such as, by a first RFID reader (Antenna 1) and a second RFID reader (Antenna 2)), respectively.
FIG. 10 depicts a schematic drawing illustrating an exemplary row detection technique according to various example embodiments of the present invention.

As mentioned above, for a particular article, $x_i$ and $z_i$ can be obtained in the data obtained from the scanning process by checking where the identifier corresponding to that particular article appears in the two scans along the first and second rows, respectively. As a non-limiting example, FIG. 9 illustrates the runs or instances at which the identifier corresponding to a particular article appears in the two scans along the first and second rows (e.g., upper and lower tiers, such as, by a first RFID reader (Antenna 1) and a second RFID reader (Antenna 2)), respectively. In particular, the identifier corresponding to the particular article appeared in instances $x_1$ to $x_5$ in relation to the first row, and instances $z_1$ to $z_3$ in relation to the second row.

In various example embodiments, determining whether the article corresponding to an identifier detected when scanning a row belongs to the row includes determining a presence indicator or metric with respect to the article for each of the possible or candidate rows, respectively. In this regard, the presence indicator provides a measure of a presence of the article in the respective row. The row amongst the candidate rows which the article belongs to may then be determined by comparing the presence indicators respectively obtained for the candidate rows, such as the row where the associated presence indicator determined has the largest value.

As an exemplary illustration, following on from the above-mentioned non-limiting example shown in FIG. 9, for a particular article, the row amongst the two rows which the article belongs to may be determined as follows.

Based on instances $x_i$ and $z_i$ as shown in FIG. 9 derived from the data obtained, a first presence indicator or metric ($A_1$) for the first row and a second metric ($A_2$) for the second row, respectively, may be computed compute as follows.

$$A_1 = \sum_{i=1}^{n} |x_i - \bar{x}|, \bar{x} = \sum_{i=1}^{n} x_i/n \quad \text{(Equation 1)}$$

$$A_2 = \sum_{i=1}^{m} |z_i - \bar{z}|, \bar{z} = \sum_{i=1}^{m} z_i/m \quad \text{(Equation 2)}$$

In various example embodiments, the presence indicator ($A_k$) with respect to an article i for a row k (e.g., tier k) may be set to a first predetermined number, such as "0" if and only if there is only one instance in which the identifier corresponding to the article i has been detected in that row k. Further, if the article i is not detected in row k, then the presence indicator ($A_k$) for that row k may be set to a second predetermined number, such as any negative number.

In various embodiments, the presence indicator with respect to a particular article for a row counts the number of times (frequency) in which an identifier corresponding to the particular article is detected in the row (or more specifically, the number of times minus one), weighted by differences in distance of each instance in which the identifier is detected from a mean (average) of all the instances ($\bar{x}$). Based on this technique, the presence indicator with respect to an article for a row is larger when the identifier corresponding to the article is detected more often and with a greater spread in the row.

The presence indicators obtained for the candidate rows may then be compared to determine which row amongst the candidate rows the article belongs to. In various example embodiments, the row amongst the candidate rows which the associated presence indicator determined has the largest value may be determined to be the row to which the article belongs to. As an example, following on from the above-mentioned non-limiting example shown in FIG. 9 and assuming the two rows being two tiers, if $A_1>A_2$, decide or determine article i to be in the upper tier of the two candidate tiers. Otherwise, decide or determine article i to be in the lower tier of the two candidate tiers. In the unlikely event that $A_1=A_2$, for example, the article may arbitrarily or randomly be determined to be in either the upper or lower tier of the two candidate tiers.

FIG. 10 depicts a schematic drawing illustrating the exemplary row detection technique described above involving two adjacent tiers. Without wishing to be bound by theory, but the likelihood of the RFID reader detecting or registering tag i during a scan depends on the distance of the tag to the position of the reader at that particular scan. The shorter the distance, the more likely the tag will be detected or registered by the RFID reader. In this regard, various example embodiments of the present invention identified that if a particular article is located at the upper tier of the two candidate tiers, the identifier corresponding to that particular article should have more readings and a wider spread since the distance from the article to the first RFID reader (Antenna 1) scanning the upper tier is closer than the distance from the article to the second RFID reader (Antenna 2) (or the first RFID reader when scanning along the lower tier).

Although the above-described presence indicators or metrics may be utilized in the row detection technique according to various example embodiments of the present invention, it will be appreciated by a person skilled in the art that different presence indicators or metrics may also be used to provide a measure of a presence of the article in a particular row, such as but not limited to, based on the number of instances in which the identifier corresponding to the article has been detected in each candidate row.

The exemplary row detection technique involving two adjacent rows may be generalized to more number of rows as follows. First, for a particular article i, the presence indicator $A_k$ is computed for each row k of the candidate rows separately. Then the article i is determined to be on row t if the corresponding $A_t$ is the largest amongst the presence indicators obtained for the candidate rows. For example, the row detection technique may be performed for all tagged articles detected to determine or confirm the row which each tagged article belongs to.

Although the row detection technique has been described with respect to two adjacent tiers as an example, the row detection technique is also similarly applicable to detect the row amongst multiple candidate rows in a depth direction of the shelving structure (e.g., front and back rows, such as corresponding to front and back bays or compartments) in which the article detected is located. In such a case, a presence indicator $A_t$ is computed for each row (e.g., front and back rows), then whether the article is in a particular row may be determined based on the presence indicators determined for the candidate rows, such as by comparing the presence indicators determined in the same or similar manner as described hereinbefore.

Referring back to FIG. 7, the single row sequencing technique 712, 716 (or RFID sequencing for one row) is performed for each row after the row detection technique has assigned the articles detected to their respective rows which they belong to. The single row sequencing step may then be performed for each row. By way of an example, let $y_i$ be the reference (e.g., predetermined or expected) relative position of article i in a particular row as retrieved from the database. As mentioned hereinbefore, the article may be arranged based on their identifier (e.g., call number) which may generated based on the article's bibliography information, such as the author's names and/or the article's title. The single row sequencing technique seeks to locate articles that are misplaced (mis-sequenced) in the row as compared to the reference relative position in the row, subject to a predetermined position threshold.

As an example, let $x_{ij}$ be the runs (instances) in which the identifier of article i was detected in the row under consideration and assuming that article i has been detected in $M_i$ runs. In various example embodiments, the single row sequencing technique includes a first step configured to estimate the relative position of the article based on the runs (instances) along a row in which the identifier corresponding to the article has been detected. In various example embodiments, the relative position of the article in the row may be estimated based on an average of the numbers associated with the runs (instances) along the row in which the identifier of the article has been detected. By way of a non-limiting example, according to various example embodiments, the relative position of the article in the row may be estimated by minimizing the following mean square error criteria:

$$\min_{\hat{x}_i} \sum_{j=1}^{M_i} (x_{ij} - \hat{x}_i)^2 \quad \text{(Equation 3)}$$

where $\hat{x}_i$ denotes the estimated relative position of the article.

In an example, the solution to the above minimization may be determined by averaging the numbers associated with the instances along the row in which the identifier of the article has been detected as follows:

$$\hat{x}_i = \sum_{j=1}^{M_i} x_{ij}/M_i \qquad \text{(Equation 4)}$$

Once the relative position $(\hat{x}_1, \hat{x}_2, \ldots \hat{x}_N)$ for each article detected (assuming articles 1 to N are detected, that is, determined to belong to a particular row) have been determined, the relative positions of each article detected in the row may then be sorted in a particular or predetermined order. For example, the articles may be sorted in an ascending order based on their corresponding values of the estimated relative positions $\hat{x}_1, \hat{x}_2, \ldots \hat{x}_N$.

In various embodiments, the estimated relative position $\hat{x}_i$ of an article i may be expressed in or converted into an integer representing the relative order or sequence of the article, $\hat{y}_i$. For example, the first article in the row may be represented by an integer "1", the second article in the row may be represented by an integer "2", and so on. As an illustrative example and without limitation, $\hat{x}_1=1.5$, $\hat{x}_2=1.8$, $\hat{x}_3=2.2$ may be converted to $\hat{y}_1=1$, $\hat{y}_2=2$, $\hat{y}_3=3$ In various example embodiments, it is noted that in relation to the data obtained from the RFID reader(s), the direction in which the RFID reader(s) traverses to scan each row may be unknown, such as whether the scanning motion for a particular row was performed in a forward direction or sequence (e.g., from a left end to a right end of the row), or a reverse direction or sequence (e.g., from a right end to a left end of the row). Accordingly, before determining any misplaced article(s) in a particular row, the data obtained from the RFID reader(s) may be analyzed to determine the direction in which the scanning motion along a row was performed. Therefore, in various example embodiments, before comparing the estimated relative positions of the detected articles in a particular row with the corresponding reference relative positions of the detected articles stored in a database, a scanning direction determining technique is provided to determine the direction of the scanning motion to obtain the data for that particular row.

In various example embodiments, the scanning direction determining technique for a particular row may be performed based on a window size (W), such as but not limited to, the following two equations:

$$F = \sum_{i=1}^{W} |y_i - \hat{y}_i| + \sum_{i=N-W+1}^{N} |y_i - \hat{y}_i| \qquad \text{(Equation 5)}$$

$$B = \sum_{i=1}^{W} |y_i - \hat{y}_{N-i+1}| + \sum_{i=N-W+1}^{N} |y_i - \hat{y}_{N-i+1}| \qquad \text{(Equation 6)}$$

where N denotes the total number of articles detected, $y_i$ denotes the reference relative position of an article i in the database, and $\hat{y}_i$ denotes the estimated relative position of an article i. In various embodiments, both $y_i$ and $\hat{y}_i$ are positive integers. For example, using a larger N may be more accurate but requires higher computation. It will be appreciated by a person skilled in the art that the window size (W) may be set based on various factors. For example and without limitation, a heuristics rule may be employed to set W based on a percentage of N, such as but not limited to 5% to 50%, 10% to 40%, or 10% to 20%. For example, the maximum value of W may be N/2 (assuming N is even), in which case all articles are used for calculating F and B.

Based on Equations 5 and 6, if F≤B, the data obtained from the scanning process for the particular row is considered to be in a forward direction or sequence (or normal sequence). Otherwise, the data is considered to be in a reverse direction or sequence. In such a case, for example, the following mapping: $y_i \rightarrow y_{N-i+1}$ may be applied to the database for the reference relative positions for that particular row to address the mismatch in the direction between the sequence order of the estimated relative positions determined and the sequence order of the corresponding reference relative positions stored in the database.

In a subsequent step of the single row sequencing technique, to determine or detect any misplaced articles in a particular row, a predetermined threshold such as a tolerance level tol may be defined. In various example embodiments, determining whether a detected article in a row is misplaced may include determining a difference between the estimated relative position of the article in the row and the corresponding reference (e.g., predetermined or expected) relative position (retrieved from the database) of the article in the row, and determining that the item is misplaced if the difference is more than the predetermined threshold. As a non-limiting example, an article may be determined to be misplaced in a row if the difference between the estimated relative position of the article in the row and the corresponding reference relative position of the article in the row in the database is above the predetermined threshold, that is, if the following equation is satisfied:

$$|y_i - \hat{y}_i| > \text{tol} \qquad \text{(Equation 7)}$$

In various example embodiments, the reference (e.g., expected or correct) sequence of articles for a row may be known in advance, and the reference sequence (relative positions $y_i$) of articles corresponding to such a row may thus be extracted from the database accordingly for comparison with the estimated sequence (relative positions $\hat{y}_i$) of articles detected in the row to determine whether any article of the detected articles in the row is misplaced. In various other example embodiments, the reference sequence of articles may not be known in advance. In such a case, for example, for the articles that have been detected in a row, sequencing is performed for such articles to produce a reference sequence of articles for the row. For example, the sequencing may be performed based on a predetermined rule such as by ordering the detected articles based on their identifiers (e.g., in increasing order of their call numbers).

Figure 11:
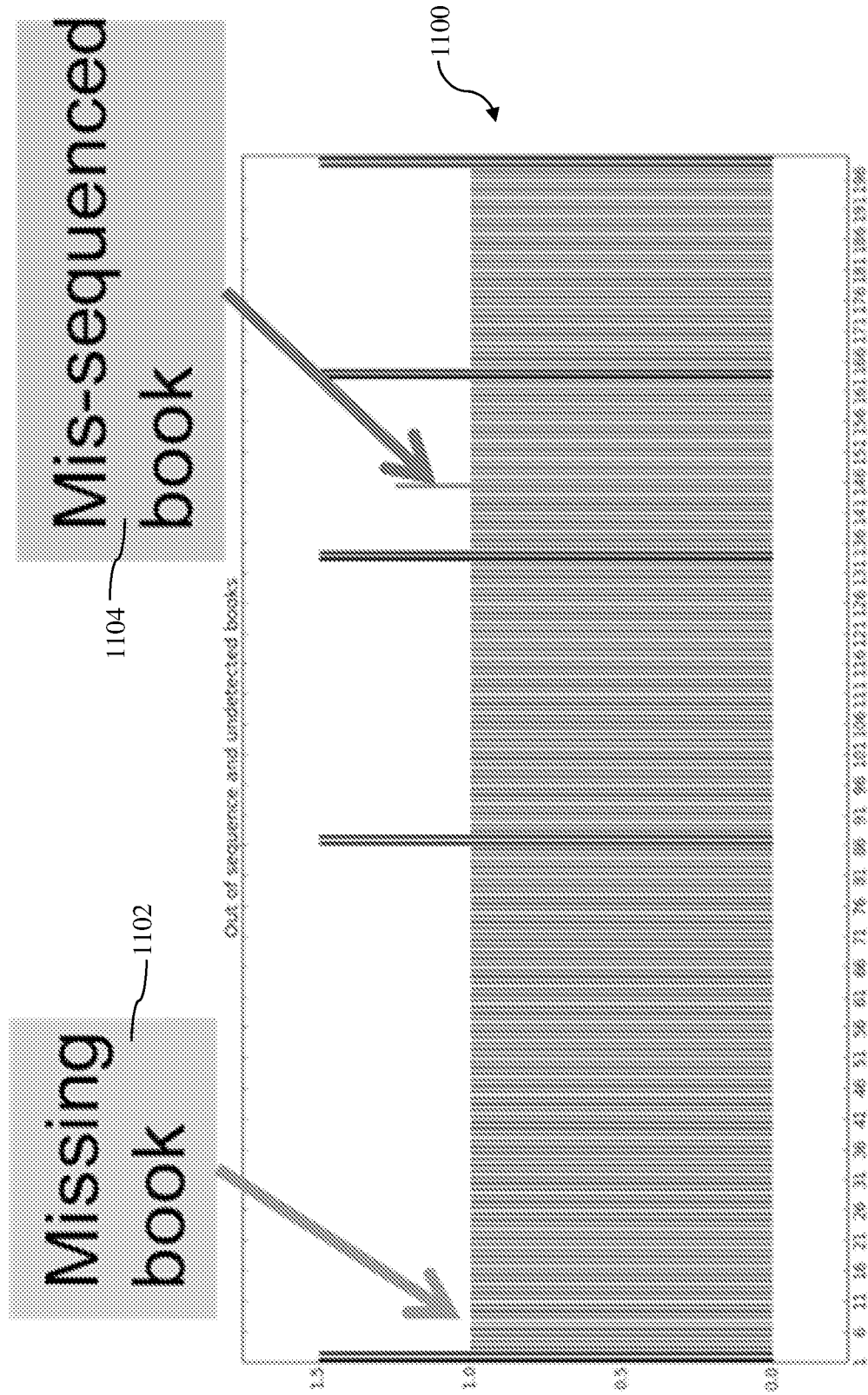
FIG. 11 depicts an exemplary representation of an output of the single row sequencing technique according to various example embodiments of the present invention where an article is determined to be missing and an article is determined to be misplaced

FIG. 11 depicts an exemplary representation 1100 of an output of the single row sequencing technique according to various example embodiments of the present invention where an article 1102 is determined to be missing and an article 1104 is determined to be misplaced. In FIG. 11, the x-axis refers to the estimated position of each detected article $\hat{y}_i$. For example, as shown in FIG. 11, an article detected to be misplaced may be plotted differently (e.g., as a taller bar) to assist visual identification.

In an experiment conducted using the inventory control method according to various example embodiments of the present invention and involving a test run of 196 books, the inventory control method was found to be able to localize or identify misplaced books with about 5% error or less. The inventory control method was also able to detect missing books with a confidence level of 99% or more. In various example embodiments, the accuracy and detection probability may be improved by reducing the speed of the scanning motion of the RFID reader, reducing the distance between the RFID reader(s) and the articles during scanning, and/or increasing the power of the RFID reader(s).

While embodiments of the invention have been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method of inventory control for an inventory comprising items sequentially arranged on one or more structures, each of the items having a radio frequency tag associated thereto, the radio frequency tag having stored therein an identifier for identifying the item associated thereto, the method comprising:
   obtaining data in relation to a plurality of items arranged in a row on a structure, the data comprising a plurality of sets of identifiers detected from interrogating the radio frequency tags of the plurality of items at a plurality of instances along the row, each set of identifiers being detected at a respective instance of the plurality of instances along the row;
   determining a sequence of detected items in the row based on the data obtained, the sequence comprising estimated relative positions of the detected items in the row; and
   determining whether an item of the detected items in the row is misplaced based on the estimated relative position of the item in the row and a reference relative position of the item in the row,
   wherein said determining a sequence of detected items comprises, for each of the detected items in the row, estimating relative position of the item in the row based on each of one or more instances of the plurality of instances along the row in which the identifier of the item has been detected to produce the estimated relative position of the item in the row, and
   wherein the plurality of instances along the row is associated with a series of increasing or decreasing numbers, respectively, and the relative position of the item in the row is estimated based on each of one or more numbers associated with the respective one or more instances of the plurality of instances along the row in which the identifier of the item has been detected.

2. The method according to claim 1, wherein the relative position of the item in the row is estimated based on an average of the one or more numbers associated with the respective one or more instances of the plurality of instances along the row in which the identifier of the item has been detected.

3. The method according to claim 1, wherein said determining whether an item of the detected items in the row is misplaced comprises:
   determining a difference between the estimated relative position of the item in the row and the reference relative position of the item in the row; and
   determining whether the item is misplaced based on whether the difference is more than a predetermined threshold.

4. The method according to claim 1, further comprising:
   obtaining one or more additional data in relation to respective one or more pluralities of items arranged in respective one or more additional rows on the structure, each additional data comprising a plurality of sets of identifiers detected from interrogating the radio frequency tags of the plurality of items at a plurality of instances along the respective additional row, each set of identifiers being detected at a respective instance of the plurality of instances along the respective additional row; and
   determining, for each identifier detected in the data associated with the row, whether the item corresponding to the identifier belongs to the row based on the data and the one or more additional data obtained, wherein the items determined to belong to the row constitute the detected items in the row.

5. The method according to claim 4, wherein said determining, for each identifier detected in the data associated with the row, whether the item corresponding to the identifier belongs to the row is based on the respective number of times the identifier has been detected in the data associated with the row and the one or more additional data associated with the one or more additional rows.

6. The method according to claim 5, wherein said determining, for each identifier detected in the data associated with the row, whether the item corresponding to the identifier belongs to the row comprises:
   determining a presence indicator with respect to the item for each of a plurality of rows comprising the row and the one or more additional rows, respectively, the presence indicator providing a measure of a presence of the item in the respective row; and
   determining whether the item corresponding to the identifier belongs to the row based on a comparison of the presence indicators determined for the plurality of rows.

7. The method according to claim 6, wherein the plurality of instances along each of the plurality of rows is associated with a series of increasing or decreasing numbers, respectively, and
   said determining a presence indicator with respect to the item for each of a plurality of rows comprises determining the presence indicator with respect to the item for a row of the plurality of rows based on a plurality of deviation values, each deviation value being determined based on a difference between a respective one of the numbers associated with instances of the plurality of instances along the row in which the identifier has been detected and an average of said numbers.

8. The method according to claim 4, wherein the row and the one or more additional rows correspond to shelves of a structure, respectively, at different tiers thereof, and the one or more additional rows are located adjacent the row.

9. An inventory control system for an inventory comprising items sequentially arranged on one or more structures, each of the items having a radio frequency tag associated thereto, the radio frequency tag having stored therein an identifier for identifying the item associated thereto, the system comprising:
   a memory; and
   at least one processor coupled to the memory and configured to:
      obtain data in relation to a plurality of items arranged in a row on a structure, the data comprising a plurality of sets of identifiers detected from interrogating the radio frequency tags of the plurality of items at a plurality of instances along the row, each set of identifiers being detected at a respective instance of the plurality of instances along the row;

determine a sequence of detected items in the row based on the data obtained, the sequence comprising estimated relative positions of the detected items in the row; and determine whether an item of the detected items in the row is misplaced based on the estimated relative position of the item in the row and a reference relative position of the item in the row, wherein said determine a sequence of detected items comprises, for each of the detected items in the row, estimating relative position of the item in the row based on each of one or more instances of the plurality of instances along the row in which the identifier of the item has been detected to produce the estimated relative position of the item in the row, and wherein the plurality of instances along the row is associated with a series of increasing or decreasing numbers, respectively, and the relative position of the item in the row is estimated based on each of one or more numbers associated with the respective one or more instances of the plurality of instances along the row in which the identifier of the item has been detected.

10. The inventory control system according to claim 9, wherein the relative position of the item in the row is estimated based on an average of the one or more numbers associated with the respective one or more instances of the plurality of instances along the row in which the identifier of the item has been detected.

11. The inventory control system according to claim 9, wherein said determine whether an item of the detected items in the row is misplaced comprises:

determining a difference between the estimated relative position of the item in the row and the reference relative position of the item in the row; and determining whether the item is misplaced based on whether the difference is more than a predetermined threshold.

12. The inventory control system according to claim 9, wherein the at least one processor coupled to the memory is further configured to:

obtain one or more additional data in relation to respective one or more pluralities of items arranged in respective one or more additional rows on the structure, each additional data comprising a plurality of sets of identifiers detected from interrogating the radio frequency tags of the plurality of items at a plurality of instances along the respective additional row, each set of identifiers being detected at a respective instance of the plurality of instances along the respective additional row; and determine, for each identifier detected in the data associated with the row, whether the item corresponding to the identifier belongs to the row based on the data and the one or more additional data obtained, wherein the items determined to belong to the row constitute the detected items in the row.

13. The inventory control system according to claim 12, wherein whether the item corresponding to the identifier belongs to the row is determined based on the respective number of times the identifier has been detected in the data associated with the row and the one or more additional data associated with the one or more additional rows.

14. The inventory control system according to claim 13, wherein said determine, for each identifier detected in the data associated with the row, whether the item corresponding to the identifier belongs to the row comprises:

determining a presence indicator with respect to for the item for each of a plurality of rows comprising the row and the one or more additional rows, respectively, the presence indicator providing a measure of a presence of the item in the respective row; and determining whether the item corresponding to the identifier belongs to the row based on a comparison of the presence indicators determined for the plurality of rows.

15. The inventory control system according to claim 14, wherein the plurality of instances along each of the plurality of rows is associated with a series of increasing or decreasing numbers, respectively, and said determine a presence indicator with respect to the item for each of a plurality of rows comprises determining the presence indicator with respect to the item for a row of the plurality of rows based on a plurality of deviation values, each deviation value being determined based on a difference between a respective one of the numbers associated with instances of the plurality of instances along the row in which the identifier has been detected and an average of said numbers.

16. A computer program product, embodied in one or more non-transitory computer-readable storage mediums, comprising instructions executable by at least one processor to perform the method of inventory control for an inventory comprising items sequentially arranged on one or more structures, each of the items having a radio frequency tag associated thereto, the radio frequency tag having stored therein an identifier for identifying the item associated thereto, the method comprising:

obtaining data in relation to a plurality of items arranged in a row on a structure, the data comprising a plurality of sets of identifiers detected from interrogating the radio frequency tags of the plurality of items at a plurality of instances along the row, each set of identifiers being detected at a respective instance of the plurality of instances along the row;

determining a sequence of detected items in the row based on the data obtained, the sequence comprising estimated relative positions of the detected items in the row; and determining whether an item of the detected items in the row is misplaced based on the estimated relative position of the item in the row and a reference relative position of the item in the row, wherein said determining a sequence of detected items comprises, for each of the detected items in the row, estimating relative position of the item in the row based on each of one or more instances of the plurality of instances along the row in which the identifier of the item has been detected to produce the estimated relative position of the item in the row, and wherein the plurality of instances along the row is associated with a series of increasing or decreasing numbers, respectively, and the relative position of the item in the row is estimated based on each of one or more numbers associated with the respective one or more instances of the plurality of instances along the row in which the identifier of the item has been detected.

* * * * *